(12) United States Patent
Kato

(10) Patent No.: US 7,628,454 B2
(45) Date of Patent: Dec. 8, 2009

(54) VEHICLE SEAT

(75) Inventor: Hideyuki Kato, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/907,752

(22) Filed: Oct. 17, 2007

(65) Prior Publication Data

US 2008/0093910 A1    Apr. 24, 2008

(30) Foreign Application Priority Data

Oct. 20, 2006    (JP)    ............................. 2006-286223

(51) Int. Cl.
*A47C 1/00* (2006.01)
*A47B 97/00* (2006.01)

(52) U.S. Cl. .................................... 297/391; 297/463.2

(58) Field of Classification Search ................ 297/391, 297/408, 463.2, 114, 61, 283.4, 403, 216.12, 297/487, 488, 146
See application file for complete search history.

(56) References Cited

U.S. PATENT DOCUMENTS 4,536,027 A * 8/1985 Brennan ...................... 297/124
4,779,928 A * 10/1988 Collier et al. ................ 297/391
5,092,652 A * 3/1992 Macaluso .................... 297/146
5,681,079 A * 10/1997 Robinson ..................... 297/61
7,044,555 B2 * 5/2006 Saberan ....................... 297/408
7,311,356 B2 * 12/2007 Pudney .................... 297/188.01
7,410,218 B2 * 8/2008 Kotani et al. ................ 297/408

FOREIGN PATENT DOCUMENTS

| JP | 2005-73833 A | 3/2005 |
| JP | 2005-075074 | 3/2005 |
| JP | 2005-075266 | 3/2005 |

OTHER PUBLICATIONS

Japanese Office Action dated Sep. 9, 2008.

* cited by examiner

*Primary Examiner*—Milton Nelson, Jr.
(74) *Attorney, Agent, or Firm*—Finnegan, Henderson, Farabow, Garrett & Dunner, LLP

(57) ABSTRACT

A vehicle seat, which prevents a passenger from sitting thereon in an uncomfortable seat state is provided. An interference bar is received in receiving hole formed in the headrest. The interference bar extends from the receiving hole when the headrest is rotated forward in the seat back. When the headrest is fully rotated to face the front side of the seat back, the interference bar extends in the forward direction of the vehicle seat. Thus, the interference bar protruded from the receiving hole interferes with the back of the passenger and thereby prevents the passenger from sitting on the seat in the uncomfortable seat state.

20 Claims, 19 Drawing Sheets

VEHICLE SEAT

INCORPORATION BY REFERENCE

This disclosure of Japanese Patent Application No. 2006-286223, filed on Oct. 20, 2006, including the specification, drawings, and abstract is incorporated by reference in its entirety.

BACKGROUND OF THE INVENTION

1. Field of the Invention

The present invention relates to seats mounted in vehicles and, more particularly, to a vehicle seat having a foldable headrest.

2. Description of the Related Art

To efficiently utilize the space inside the passenger compartment of a vehicle, a vehicle seat, in which a headrest mounted to the upper end of a seat back can be folded onto the front of the seat back and the seat back can be folded such that the seat back is folded onto a seat cushion, is proposed and used. A vehicle seat, having the above-mentioned construction, allows a person to fold the seat back and/or the headrest and load large objects into the passenger compartment, thus efficiently utilizing the space inside the passenger compartment.

Meanwhile, in the vehicle seat of the above-mentioned construction, even if the headrest is folded onto the front of the seat back, it is possible for a passenger to sit on the seat cushion. However, when the headrest is folded onto the front of the seat back, the passenger cannot comfortably sit on the seat cushion. Japanese Patent Application Publication No. 2005-73833 (JP-A-2005-73833) describes a method of informing passengers of an uncomfortable seat state using a warning system operated alarm, etc., when the headrest is folded onto the seat back.

However, even though the warning system informs passengers of the uncomfortable seat state, a passenger may ignore the warning signal and sit on the seat cushion, and thus there is room to improve this method.

SUMMARY OF THE INVENTION

The invention provides a vehicle seat that prevents a passenger from sitting on the seat when the seat is in a state where it will not be possible for the passenger to comfortably sit on the seat.

In a vehicle seat in accordance with a first aspect of the present invention, the vehicle seat comprises a seat body that is convertible between a comfortable seat state, in which a passenger may comfortably sit on the seat body, and an uncomfortable seat state, in which a passenger cannot comfortably sit on the seat body; and an interference unit that interferes with a passenger when the passenger tries to sit on the seat body in the uncomfortable seat state.

In accordance with the first aspect of the present invention, the interference unit interferes with the body of the passenger if the passenger tries to sit on the seat body when the state of the seat body is converted from the comfortable seat state to the uncomfortable seat state. Thus, it prevents the passenger from sitting on the seat body in the uncomfortable seat state.

In the present invention, the term "uncomfortable seat state" means only the state in which the seat is not suitable for a passenger to sit on the seat body. In other words, this does not mean that it is impossible for the passenger to sit on the seat body, and does not mean that it is dangerous for the passenger to sit on the seat in the uncomfortable seat state.

The vehicle seat may comprise an interlocking unit that moves the interference unit when the seat is in the uncomfortable seat state. Wherein, the interference unit may include an interference member received in a receiving portion of the seat body in the comfortable seat state. Also, the interlocking unit may move the interference member from the receiving portion in response to interlocking with a converting of the state of the seat body from the comfortable seat state to the uncomfortable seat.

In accordance with the above aspect of the present invention, the interference member is received in receiving portion formed on the seat body in the comfortable seat state. When the state of the seat body is converted to the uncomfortable seat state, the interlocking unit extends the interference member from the receiving portion, the interlocking unit is operated according to the change in the state of the seat body. When a passenger tries to sit on the seat body in the uncomfortable seat state with the interference member protruded from the receiving portion, the interference member interferes with the body of the passenger, thus preventing the passenger from sitting on the seat body in the uncomfortable seat state.

In the vehicle seat in accordance with the above aspect, when the state of the seat is converted to the uncomfortable seat state, the interlocking unit extends the interference member from the receiving portion. In the comfortable seat state, when a passenger tries to sit on the seat body, the interference member does not interfere with the body of a passenger. Therefore, the passenger can comfortably sit on the seat body. However, when the state of the vehicle seat is converted to the uncomfortable seat state, the interference member is moved without being separately manipulated.

In a vehicle seat in accordance with each of the above aspects of the present invention, the seat body may comprise a seat cushion having a seat surface; a seat back connected to the seat cushion; and a headrest supported in a supporting position on an upper side of the seat back and moved relative to the seat back by releasing the headrest from the supporting position. A state in which the headrest is moved from the supporting position may be the uncomfortable seat state.

In accordance with the above aspect of the present invention, the headrest is provided on the upper side of the seat back connected to the seat cushion. In the comfortable seat state, the headrest is supported at the upper side of the seat back. However, when the headrest is released from the supporting position on the upper side of the seat back, the headrest is moved from the head support position, the seat comes into the uncomfortable seat state. When a passenger tries to sit on the seat cushion and lean against the seat back in the uncomfortable seat state, the interference unit interferes with the body of the passenger. Thus, the vehicle seat can prevent a passenger from sitting on the seat body in the uncomfortable seat state.

BRIEF DESCRIPTION OF THE DRAWINGS

The above and other features and advantages of the present invention will become apparent from the following description of embodiment, given in conjunction with the accompanying drawings, in which:

FIGS. 4A and 4B are views of the dashed-dotted line circle portion A of FIG. 3 viewed in the direction of arrow B, in which FIG. 4A illustrates the comfortable seat state, and FIG. 4B illustrates the uncomfortable seat state;

FIGS. 5A and 5B are views of the dashed-dotted line circle portion C of FIG. 3 viewed in the direction of arrow D, in which FIG. 5A illustrates the comfortable seat state, and FIG. 5B illustrates the uncomfortable seat state;

DETAILED DESCRIPTION OF EMBODIMENTS

Various embodiments of the present invention will now be described in detail with reference to the accompanying drawings.

Figure 6:
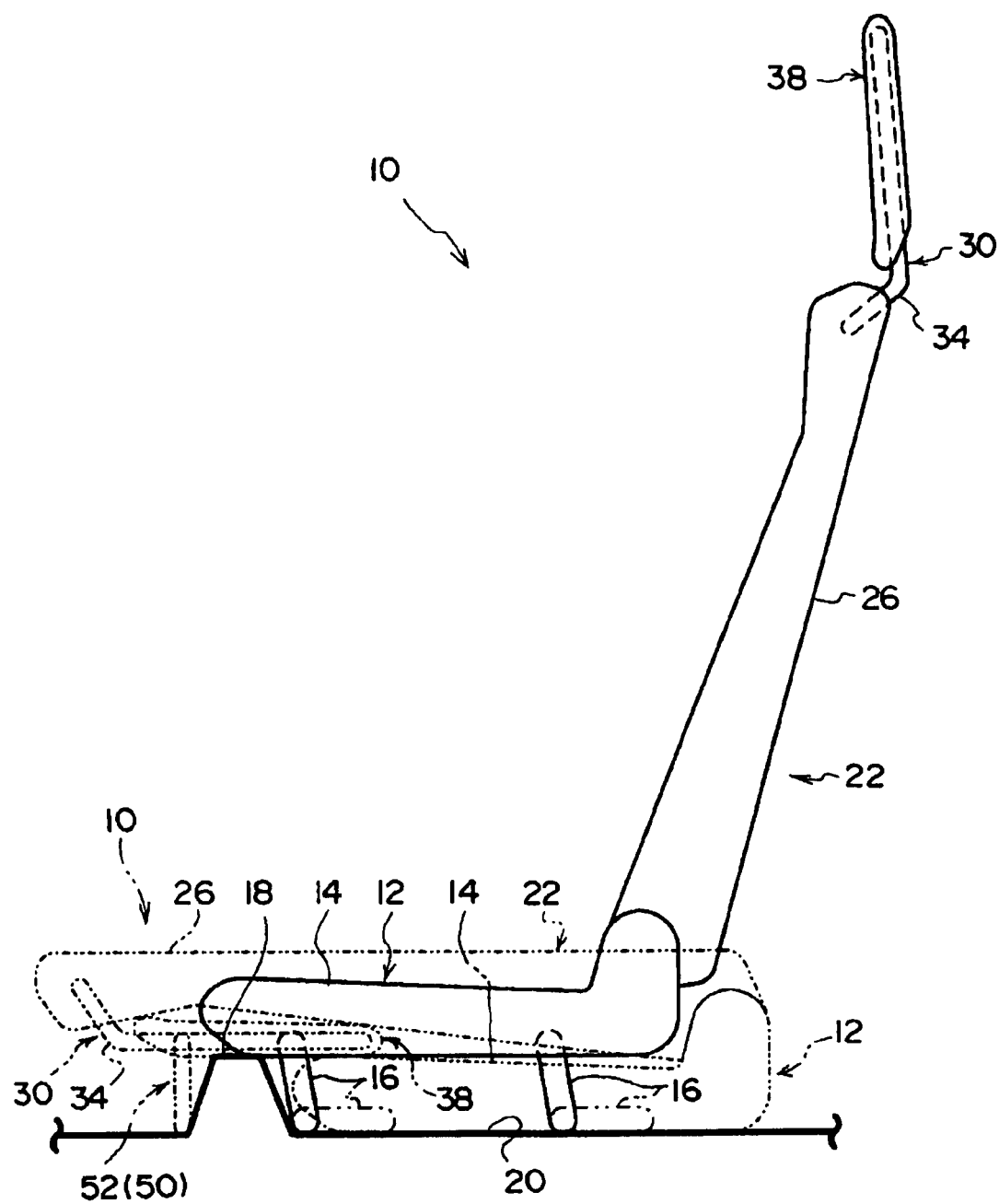
FIG. 6 is a side view schematically illustrating the overall configuration of the vehicle seat in accordance with the first embodiment of the present invention.

FIG. 6 illustrates the configuration of a vehicle seat 10 in accordance with the first embodiment of the present invention in a side view.

As shown in FIG. 6, the vehicle seat 10 includes a seat cushion 12, which constitutes the seat portion of a seat body. For example, the seat cushion 12 includes a seat cushion frame (not shown), which has a rectangular shape when viewing the frame from the top. The seat cushion frame is covered with an elastic cushion material and the cushion material is covered with a seat cushion cover 14, which may be made of cloth, leather, resin, etc.

Also, one end of each link 16 is rotatably coupled to the seat cushion frame constituting the seat cushion 12, which is defined along the width direction (lateral direction) of the vehicle seat 10. The other end of each of the links 16 is rotatably coupled to a certain location on the bottom of a seat receiving portion 20 formed at a height lower than the floor 18 of the vehicle, which is defined along a width direction of the vehicle.

That is, the seat cushion 12, the links 16, and bottom of the seat receiving portion 20 constitute a link mechanism. When the links 16 rotate in one direction, pivoting on the other ends of the links 16, the seat cushion 12 rotates relative to one ends of the links 16 and rotates, pivoting on the other ends of the links 16, to approach the bottom of the seat receiving portion 20. Thus, as shown by dashed-two dotted line in FIG. 6, the seat cushion 12 is received in the seat receiving portion 20.

In the meantime, a seat back 22 is provided at the rear end side of the seat cushion 12 and constitutes the backrest for the seat body. For example, the seat back 22 includes a seat back frame (not shown), which has a rectangular shape or a downward opened concave shape. The seat back frame may be covered with an elastic cushion material and the cushion material is covered with a seat back cover 26, which may be made of cloth, leather, resin, etc.

The lower end of the seat back frame of the seat back 22 is coupled to the rear end side of the seat cushion frame of the seat cushion 12. The seat back frame is rotatably coupled to the seat cushion frame about an axis, which is defined along a width direction (lateral direction) of the vehicle seat 10. Thus, the seat back frame rotates relative to the seat cushion 12 about an axis, which is defined along a width direction (lateral direction) of the vehicle seat 10 in one direction, the seat cushion 12 and the seat back 22 is folded in a manner that the seat back 22 rests over the seat cushion 12, as shown by dashed-two dotted line in FIG. 6.

Figure 3:
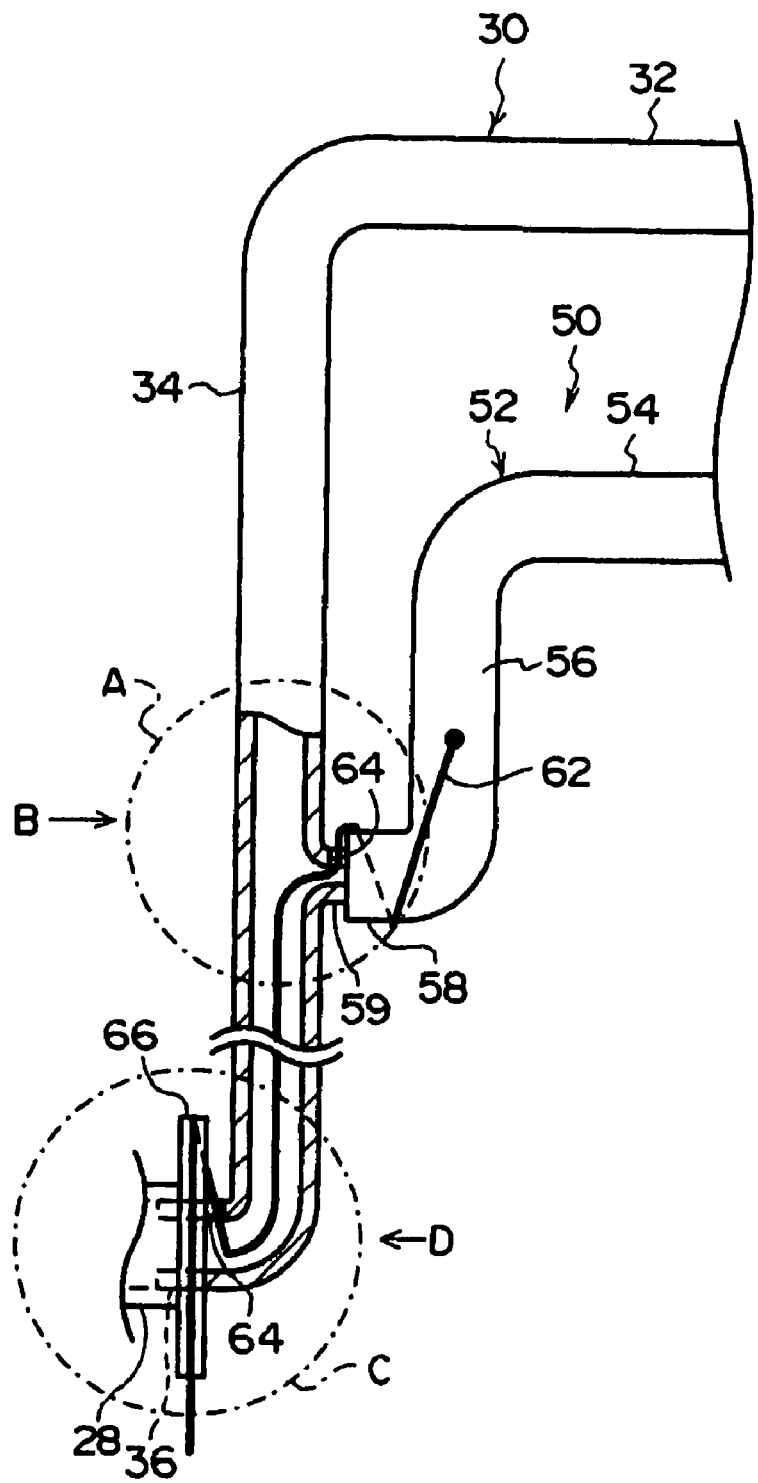
FIG. 3 is a partially sectioned front view illustrating the interior structure of the main part of the vehicle seat in accordance with the first embodiment of the present invention.

As shown in FIG. 3, a pair of supporting parts 28, on either side, are provided on the upper end side of the seat back frame. In FIG. 3, only one of the pair of supporting parts 28 provided is shown. A headrest bracket 30 is mounted on the supporting part 28. The headrest bracket 30 is formed by appropriately bending a hollow tube into the desired shape. The headrest bracket 30 includes a lateral part 32, which extends in the width direction (lateral direction) of the vehicle seat 10. A length direction of the lateral part 32 is defined in the width direction of the vehicle seat 10. A longitudinal part 34 extends downward from each end of the lateral part 32. Thus, the headrest bracket 30 is configured as a concave shape opened downward. In FIG. 3, one of the two longitudinal parts 34 is shown.

An attaching part 36 is formed outward in length direction of the lateral part 32 from an end of the longitudinal part 34 (in particular, the lower end of the longitudinal part 34) The attaching part 36 formed on one side of the longitudinal parts 34 and the attaching part 36 formed on the other side of the longitudinal parts 34 are coaxially mounted in the width direction of the vehicle seat 10. The attaching part 36 is mounted on the supporting part 28. The supporting part 28 rotatably supports the attaching part 36 about an axis, which is defined along the width direction of the vehicle seat 10.

Thus, the headrest bracket 30 may be rotated, pivoting on the attaching part 36, relative to the seat back frame.

As shown in FIG. 6, a headrest 38 constituting the seat body is supported by the headrest bracket 30. When it is desired to fold the vehicle seat 10, the headrest 38 rotates, pivoting on the attaching part 36, until the headrest 38 faces the seat back 22 in a thickness direction of the seat back 22. Then, the seat back 22 is rotated relative to the seat cushion 12 until the seat back 22 is substantially parallel to the seat cushion 12, and a surface of the headrest 38, which is opposite the surface of the seat back 22 comes into contact with the seat cushion 12. In the above state, when the folded vehicle seat 10 is pulled rearward, the seat cushion 12 rotates relative to one ends of the links 16 and rotates, pivoting on the other ends of the links 16, to approach the bottom portion of the seat receiving portion 20. Thus, as shown by dashed-two dotted line in FIG. 6, the seat cushion 12 is received in the seat receiving portion 20.

Figure 1:
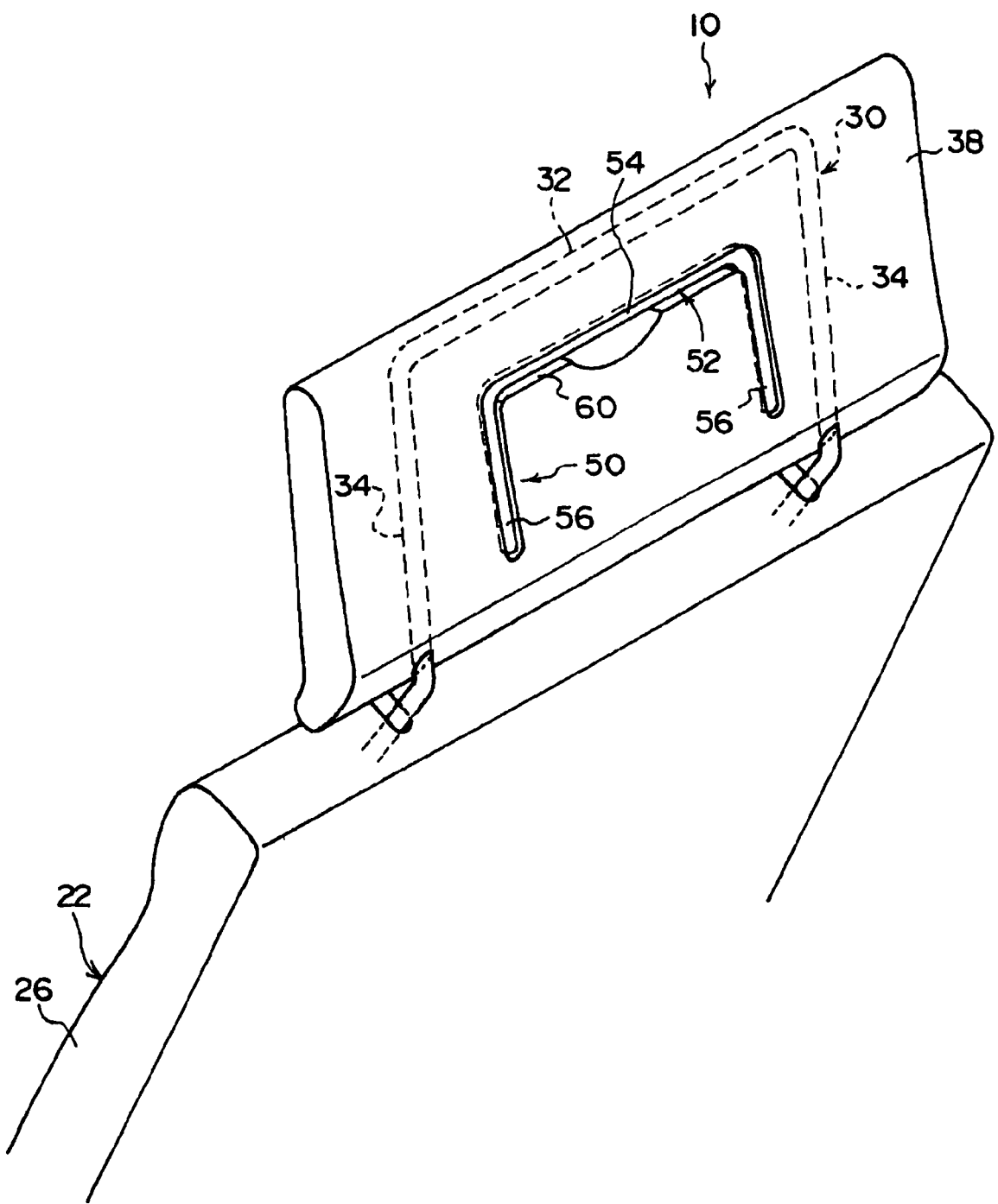
FIG. 1 is a perspective view of the main part of a vehicle seat in accordance with a first embodiment of the present invention in a comfortable seat state.
Figure 2:
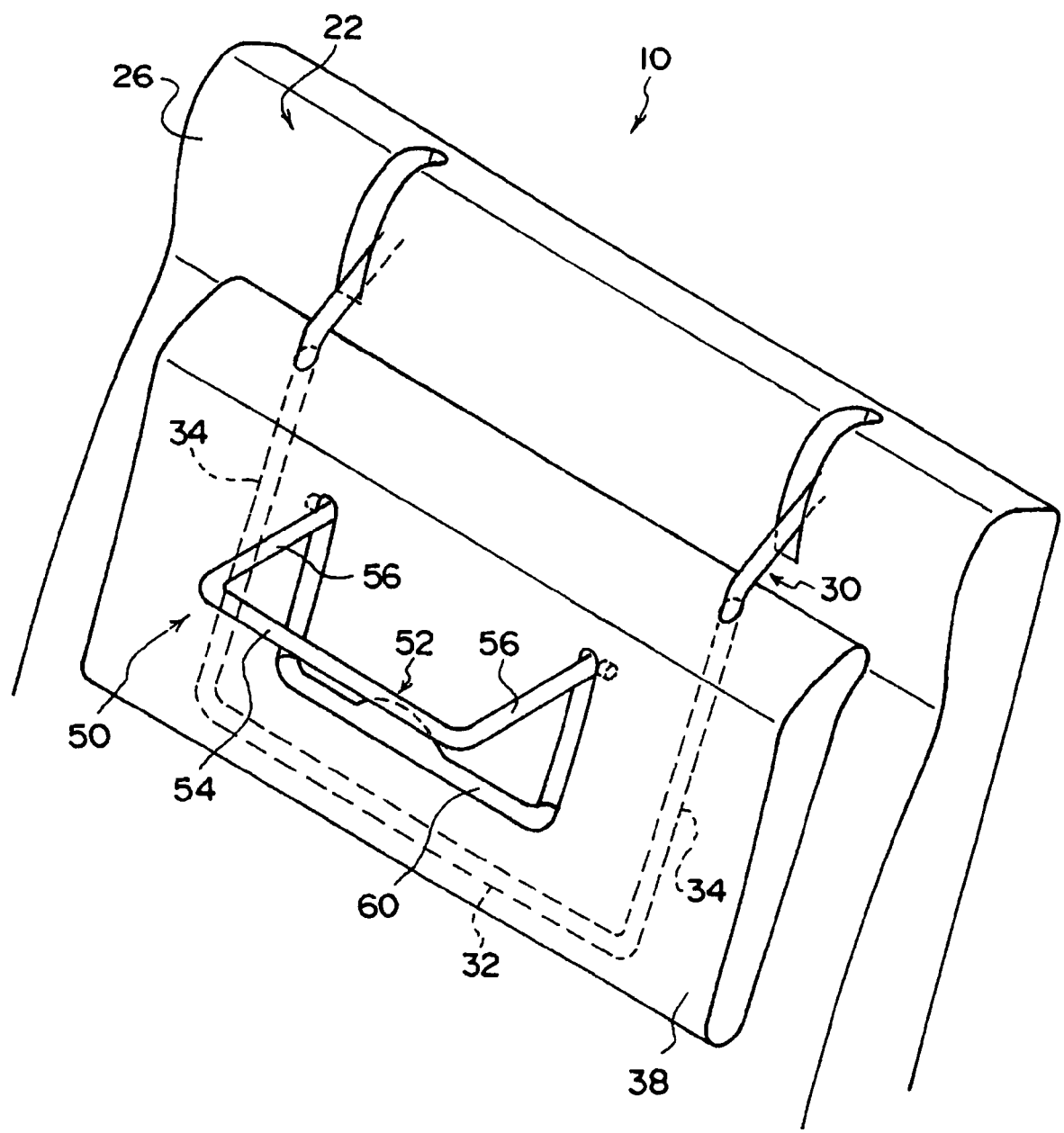
FIG. 2 is a perspective view of the main part of the vehicle seat in accordance with the first embodiment of the present invention in an uncomfortable seat state, in which a headrest is folded.

As shown in FIG. 1 and FIG. 2, the vehicle seat 10 includes a sitting restriction unit 50 as an interference unit. The sitting restriction unit 50 includes an interference bar 52 as an interference member. In the same manner as that described for the headrest bracket 30, the interference bar 52 is formed by appropriately bending a hollow tube into the desired shape. The interference bar 52 includes a lateral part 54, which extends in the width direction (lateral direction) of the vehicle seat 10. A length direction of the interference bar 52 is defined in the width direction of the vehicle seat 10. A longitudinal part 56 extends downward from each end of the length direction of the lateral part 54. Thus, the interference bar 52 is configured as a concave shape opened downward.

An attaching part 58 (see FIG. 3) is formed toward outside length direction of the lateral part 54 from an end of longitudinal part 56 (in particular, the lower end of the longitudinal part 56). The attaching part 58 formed on one side of the longitudinal parts 56 and the attaching part 58 formed on the other side of the longitudinal parts 56 are coaxially mounted in the width direction of the vehicle seat 10. The attaching parts 58 are rotatably supported by supporting parts 59, which are provided on the longitudinal part 34 of the headrest bracket 30. The interference bar 52 having the above-mentioned configuration is received in a receiving hole 60 (see FIG. 1 and FIG. 2) that is open on the rear surface of the headrest 38. When the interference bar 52 rotates in one direction, pivoting on the attaching part 58, the lateral part 54 and side of the lateral part 54 of the longitudinal part 56 extend outward from the headrest 38.

As shown in FIG. 3, one end of a wire 62 as an interlocking unit is fixed to the longitudinal part 56 of the interference bar 52. The wire 62 are wound around the attaching part 58 in the same direction as the rotating direction of the interference bar 52, which extends from the receiving hole 60. After the wire 62 is wound around the attaching part 58, the wire 62 is inserted into the attaching part 58 through passage 64 formed in the attaching part 58. Thereafter, the wire 62 passes through the longitudinal part 34 and comes out in the outside of the attaching part 36 (at locations inside the seat back 22) through passage 66 formed in the supporting part 59.

After the wire 62 comes out outward of the attaching part 36, the wires 62 are wound around the supporting parts 28 opposite to the rotating direction of the attaching part 36, which is rotated when the headrest 38 is folded. Thereafter, the wire is fixed to the seat back frame of the seat back 22, etc. A return spring (not shown) as an urging member is installed in attaching part 58. The return spring constitutes, for example, a torsion coil spring. One end of the spring is fixed to longitudinal part 34 of the headrest bracket 30. Further, the other end of the spring is fixed to the attaching part 58 or the longitudinal part 56 of the interference bar 52, and the interference bar 52 is urged around the attaching part 58 toward the receiving hole 60.

When it is desired to receive the vehicle seat 10 in the seat receiving portion 20 by folding the vehicle seat 10 in the comfortable seat state as shown by the solid line in FIG. 6, the headrest bracket 30 is rotated, pivoting on the attaching part 36, so that the headrest 38 can be moved to the front of the seat back 22. Although a passenger may still sit on the vehicle seat 10 when the vehicle seat 10 is received in the seat receiving portion 20, the head of the passenger cannot be supported by the headrest 38. Thus, the above-mentioned state of the seat 10 is not suitable for the passenger to comfortably or safely sit thereon. That is, the vehicle seat 10 is converted from the comfortable seat state to the uncomfortable seat state.

Figure 4A:
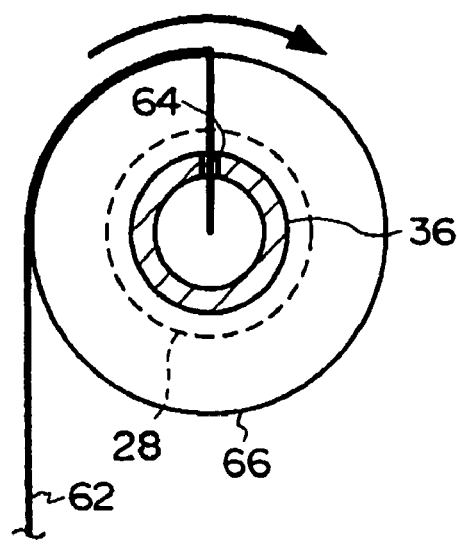
Figure 4B:
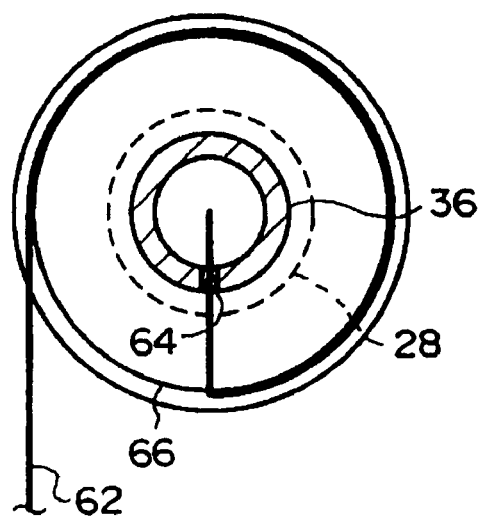

When the headrest 38 is rotated to the front of the seat back 22, pivoting on the attaching part 36, the wire 62 is wound around the supporting part 28. Because the other end side of the wire 62 is fixed to the seat back frame of the seat back 22, etc., it is impossible to wind the other end of the wire 62 around the supporting part 28. Thus, as shown in FIGS. 4A and 4B, the wire 62 must be led from the passing hole 66 to be wound around the supporting part 28. Thus, the wire 62 is pulled from one end to the other end thereof.

Figure 5A:
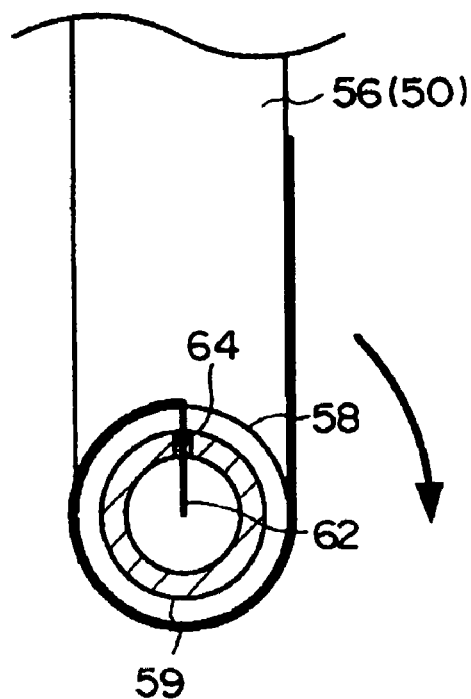
Figure 5B:
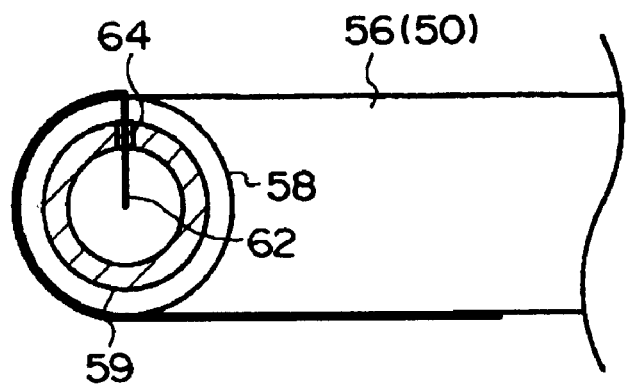

When the wire 62 is pulled in the direction from the one end to the other end thereof, the wire 62 pulls the longitudinal part 56 of the interference bar 52 and rotates the interference bar 52 about the attaching parts 58 against the urging force of the return springs. Thus, the interference bar 52 extends from the receiving hole 60, as shown in FIGS. 5A and 5B. As shown in FIG. 2, when the headrest 38 is rotated forward, the rear surface of the headrest 38 faces toward the front of the vehicle seat 10. Therefore, when a passenger tries to sit on the vehicle seat 10 in the above state, the interference bar 52 that extends from the receiving hole 60 interferes with the back of the passenger. Thus, the vehicle seat 10 in the uncomfortable seat state discourages the passenger from sitting thereon.

Figure 7:
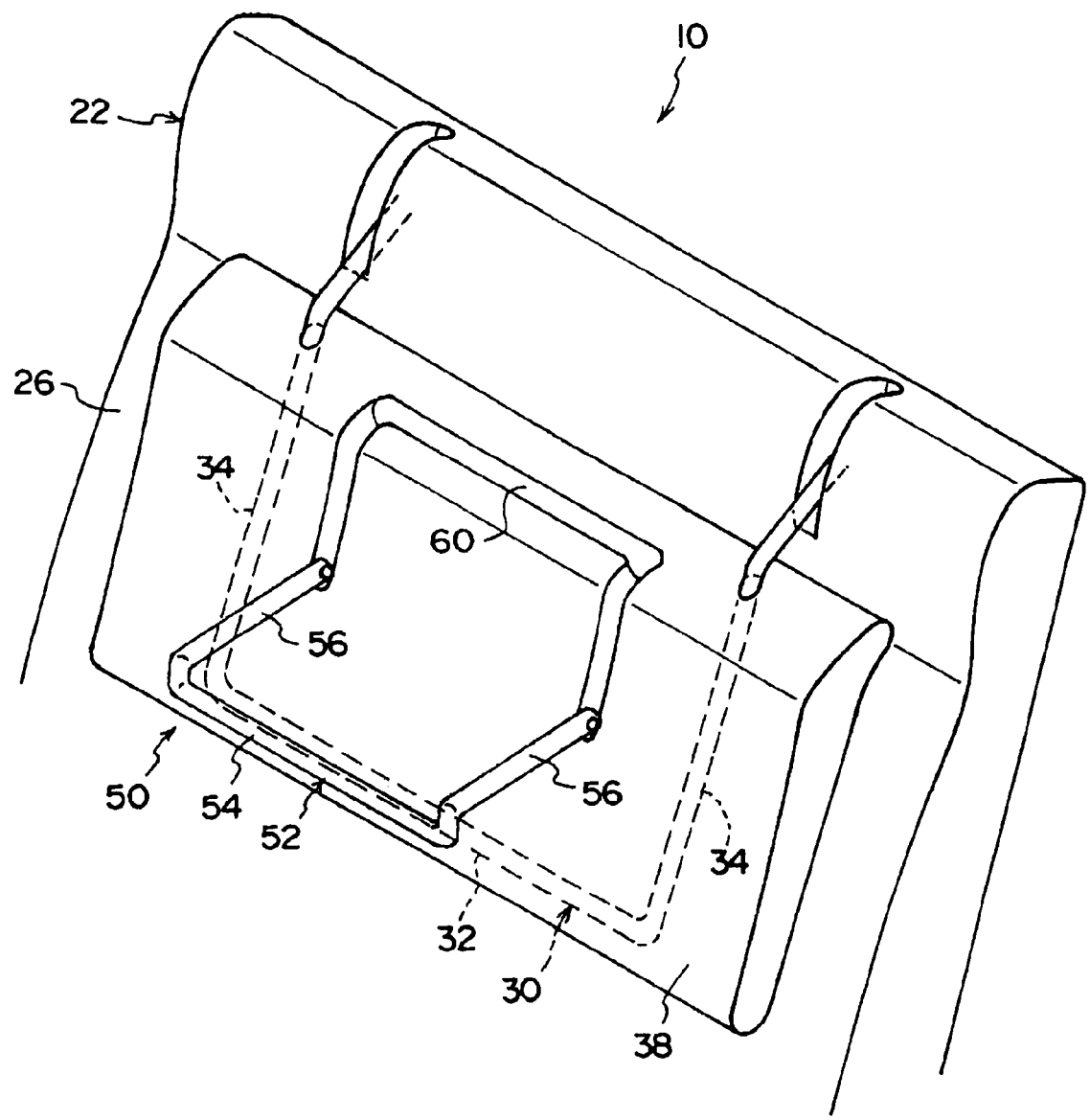
FIG. 7 is a perspective view of a main part of a vehicle seat in accordance with a first modification of the first embodiment of the present invention in an uncomfortable seat state, in which a headrest is folded.

In the first embodiment, the interference bar 52 is configured as a concave shape that opens downward relative to the headrest 38 when the interference bar 52 is received in the receiving hole 60. Thus, when the interference bar 52 extends from the receiving hole 60, the interference bar 52 is rotated opposite from the rotating direction of the headrest 38, which is rotated toward the front of the seat back 22. However, for example, as shown in FIG. 7, the interference bar 52 may be configured as a concave shape that opens upward relative to the headrest 38 when the interference bar 52 is received in the receiving hole 60. In this case, when the interference bar 52 extends from the receiving hole 60, the interference bar 52 may be rotated in the same direction as the rotating direction of the headrest 38.

Figure 8:
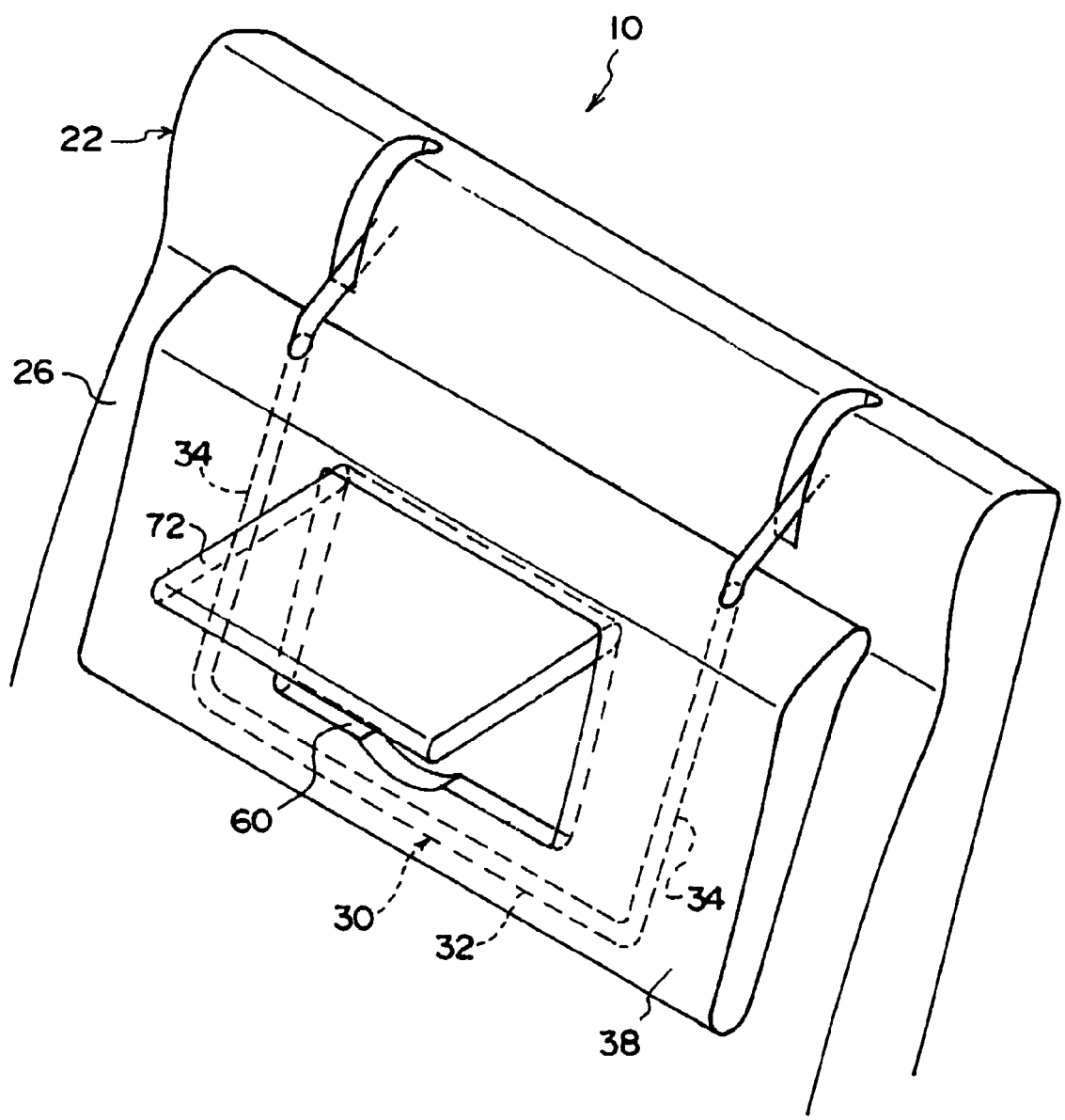
FIG. 8 is a perspective view of a main part of a vehicle seat in accordance with a second modification of the first embodiment of the present invention in an uncomfortable seat state, in which a headrest is folded.

Further, in the first embodiment, the interference member is formed by appropriately bending a tube into a desired shape. However, the interference member may alternatively be constituted by an interference plate 72 having a plate shape, as shown in FIG. 8.

Figure 9:
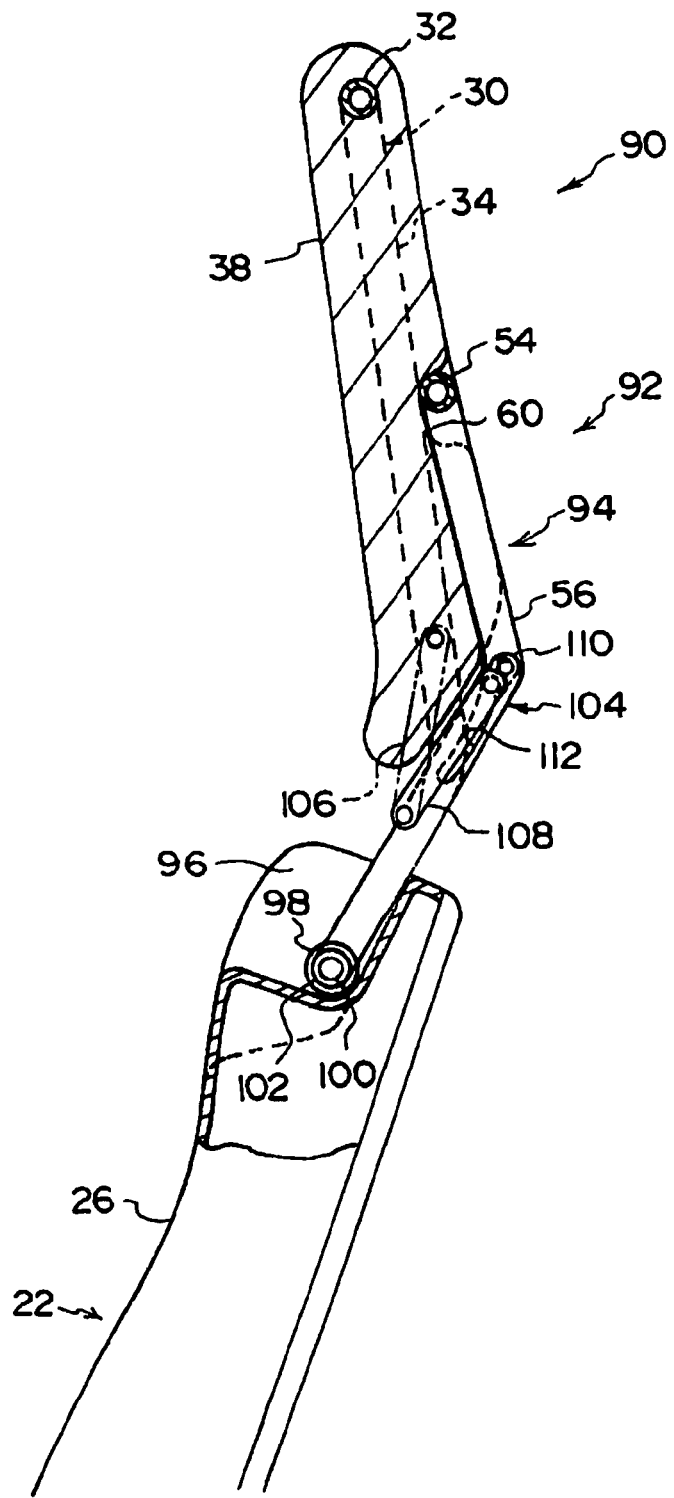
FIG. 9 is a side sectional view of a main part of a vehicle seat in accordance with a second embodiment of the present invention in a comfortable seat state.

Hereinafter, the second embodiment of the present invention will be described. In the following description of the second embodiment, the elements common to both the first embodiment and the second embodiment carry the same reference numerals, and further explanation is omitted. FIG. 9 is a sectional view illustrating the configuration of main part of a vehicle seat 90 in accordance with the second embodiment of the present invention.

As shown in FIG. 9, the vehicle seat 90 in accordance with the second embodiment includes a sitting restriction unit 92 as the interference unit, in place of the sitting restriction unit 50. The sitting restriction unit 92 includes an interference bar 94 as the interference member. Similar to the interference bar 52 of the first embodiment, the interference bar 94 includes a lateral part 54 and a pair of longitudinal parts 56 and is configured as a concave shape opened downward when the interference bar 94 is received in the receiving hole 60. However, unlike the first embodiment, in the vehicle seat 90 of the second embodiment, the end of the longitudinal part 56, which is opposite to the end of the lateral part 54, are received in recess 96 formed in the seat back 22.

The recess 96 is opened on the upper end of the seat back 22 and is also opened in the front surface of the seat back 22 in the vicinity of the upper portion of the seat back 22, such that the longitudinal part 56 of the interference bar 94 are movable in the recess 96. Further, an attaching part 98 is provided on end of the longitudinal part 56, which is opposite to an end of the lateral part 54. The attaching part 98 has a cylindrical tubular-shape penetrated in the width direction (lateral direction) of the vehicle seat 90. A support shaft 100 constituting the seat back frame passes through inside of the attaching part 98.

The support shaft 100 also passes through attaching parts 102, which are provided on the end of the longitudinal part 34 constituting the headrest bracket 30, which is opposite to the end of the lateral part 32. Thus, the support shaft 100 rotatably supports about an axis, which is defined along in the width direction of the vehicle seat 90, the two types of attaching parts 98 and 102, that is, both the interference bar 94 and the headrest 38.

Also, the vehicle seat 90 includes link mechanism 104 as the interlocking unit. The link mechanism 104 includes a first swing arm 106. The first swing arm 106 is rotatably coupled to the longitudinal part 34 of the headrest bracket 30 about an axis, which is defined in the width direction of the vehicle seat 90 at one end side length direction thereof. The other end length direction of the first swing arm 106 is rotatably coupled to one end length direction of a second swing arm 108 about an axis, which is defined in the width direction of the vehicle seat 90. The other end side length direction of the second swing arm 108 is rotatably coupled to the longitudinal part 56 of the interference bar 94 about an axis, which is defined in the width direction of the vehicle seat 90.

The interference bar 94 and the headrest bracket 30 are rotatable relative to each other around the support shaft 100. However, when the joint between the first swing arm 106 and the longitudinal part 34, the joint between the first swing arm 106 and the second swing arm 108, and the joint between the second swing arm 108 and the longitudinal part 56 are rectilinearly arranged along a line during relative rotations of the headrest bracket 30 and the interference bar 94, the relative rotations of the interference bar 94 and the headrest bracket 30, moving away from each other, are restricted. Thus, if a user rotates the headrest bracket 30 away from the interference bar 94 in the above state, the interference bar 94 is moved in the same direction as the rotating direction of the headrest bracket 30.

Further, the link mechanism 104 includes a support arm 110. The support arm 110 is rotatably coupled at one end length direction thereof to the joint between the first and second swing arms 106 and 108 about an axis, which is defined in the width direction of the vehicle seat 90, relative to the first and second swing arms 106 and 108. The other end length direction of the support arm 110 is inserted into a guide hole 112 formed in the longitudinal part 56 of the interference bar 94 at a certain position. In the above state, other end length direction of the support arm 110 is coupled to the longitudinal part 56. The guide hole 112 is a curved elongated hole around an axis, which is defined in the width direction of the vehicle seat 90. The other end length direction of the support arm 110 is rotated relative to the longitudinal part 56 about an axis, which is defined in the width direction of the vehicle seat 90, and other end length direction of the support arm 110 can be moved between the one end length direction and the other end length direction of the guide hole 112.

Also, the vehicle seat 90 includes a return spring as an urging member. The return spring of the vehicle seat 90 may be configured as a torsion coil spring, etc. One end of the return spring is fixed to the support shaft 100 and other end is fixed to the longitudinal part 56 of the interference bar 94. The return spring urges the interference bar 94 in the direction that the interference bar 94 extends from the receiving hole 60.

Figure 10:
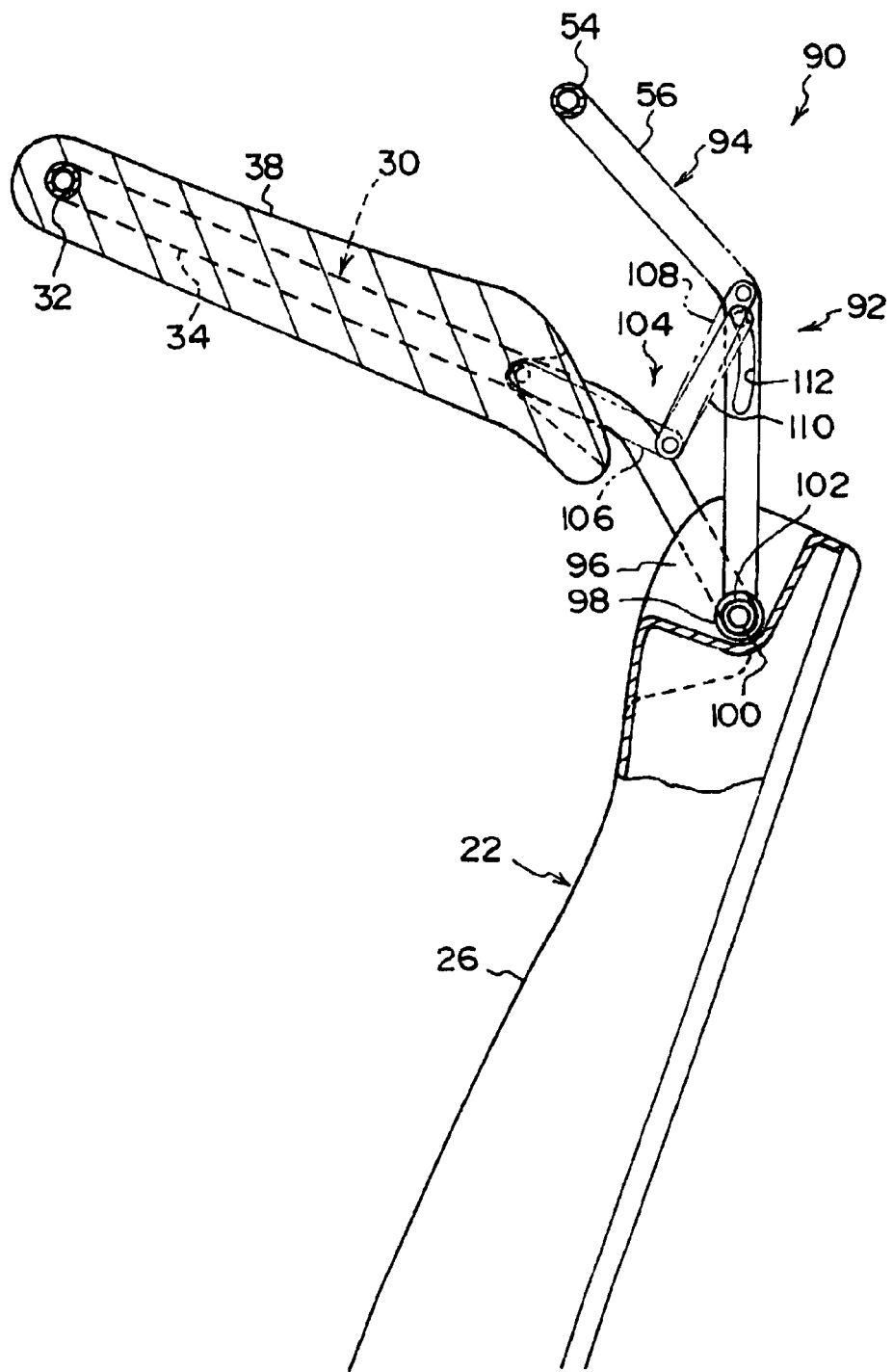
FIG. 10 is a side sectional view of a rotating motion state of the headrest, wherein FIG. 10 corresponds to FIG. 9.

As described above, the interference bar 94 of the vehicle seat 90 is urged by the return spring out from the receiving hole 60. Thus, when the headrest 38, shown in the comfortable seat state in FIG. 9, is rotated around the support shaft 100 towards the front of the seat back 22, the interference bar 94 does not follow the rotation of the headrest 38. As described above, When the headrest 38 is rotated towards the front of the seat back 22, the interference bar 94 extends from the receiving hole 60, as shown in FIG. 10. Also, in the above state, the swing arm 106 of the link mechanism 104 is rotated, pivoting on the joint between the swing arm 106 and the longitudinal part 34, while the swing arm 108 is rotated, pivoting on the joint between the swing arm 108 and the longitudinal part 56.

When the headrest 38 is rotated towards the front of the seat back 22 at a certain angle such that the headrest bracket 30 is moved away from the interference bar 94, the joint between the swing arm 106 and the longitudinal part 34, the joint between the swing arm 106 and the swing arm 108, and the joint between the swing arm 108 and the longitudinal part 56 are rectilinearly arranged on a line. In the above state, when the headrest 38 is further rotated towards the front of the seat back 22, the relative rotations of the interference bar 94 and the headrest bracket 30 in the direction moving away from each other are restricted.

Figure 11:
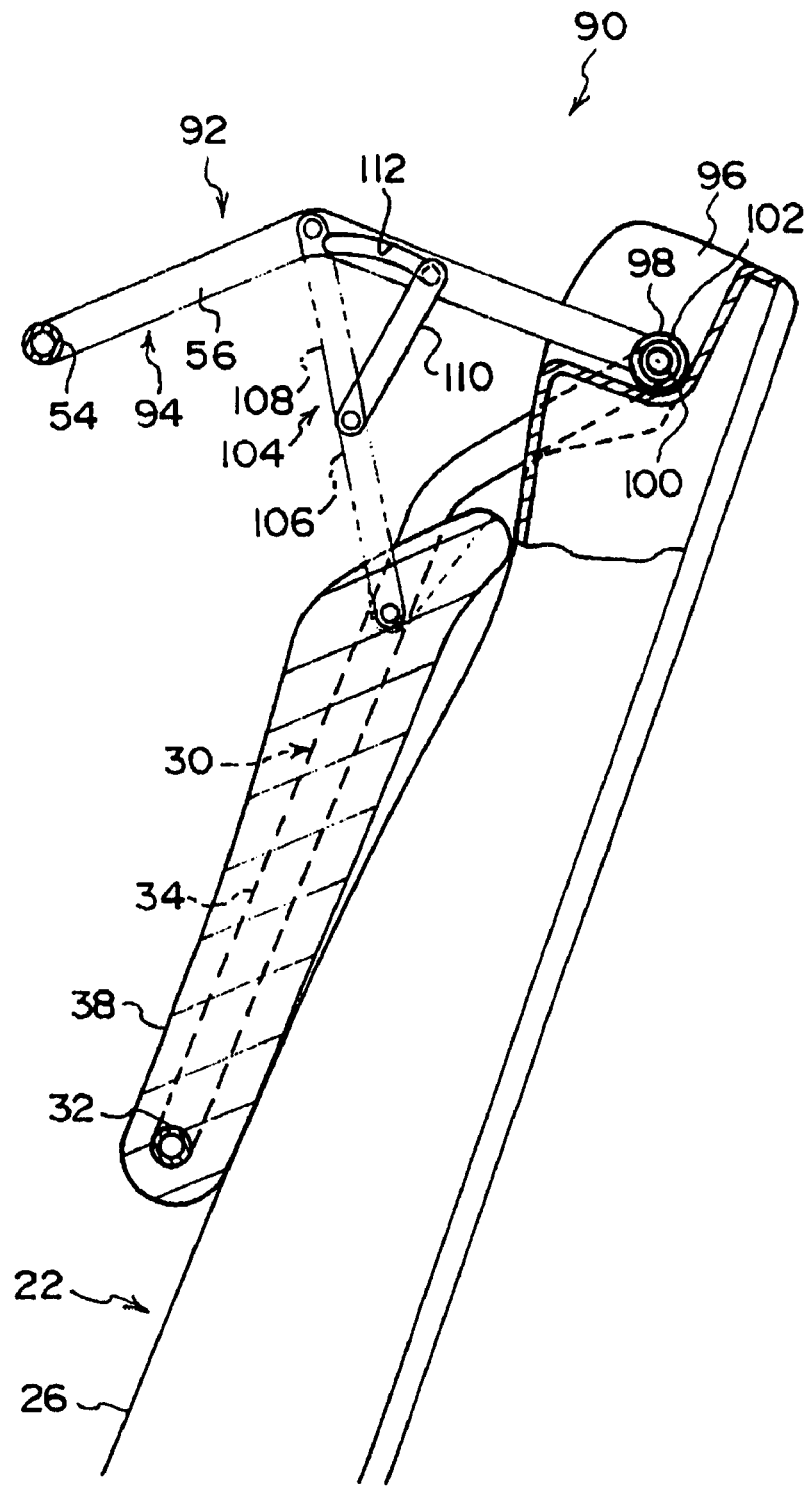
FIG. 11 is a side sectional view of an uncomfortable seat state, wherein FIG. 11 corresponds to FIG. 9.

Thus, the interference bar 94 rotates according to the rotating direction of the headrest 38 against the urging force of the return spring. When the headrest 38 is rotated toward the front of the seat back 22, as shown in FIG. 11, the interference bar 94 extended from the receiving hole 60 is located in front of the rear surface of the headrest bracket 30, which faces forward in the vehicle seat 90. Therefore, if a passenger tries to sit on the vehicle seat 90 in the above state, the interference bar 94 interferes with the back of the passenger. Thus, the vehicle seat 90 in the uncomfortable seat state prevents the passenger from sitting thereon.

Also, when the joint between the first swing arm 106 and the second swing arm 108 in the above state is moved downward, the interference bar 94 may be further rotated and moved downward. However, the joint between the first swing arm 106 and the second swing arm 108 is supported by the support arm 110, so that further downward movement of the joint between the first swing arm 106 and the second swing arm 108 is restricted. Therefore, the interference bar 94 is prevented from further rotation and further downward movement, so that the vehicle seat 90 in the uncomfortable seat state reliably prevents a passenger from sitting thereon.

Figure 12:
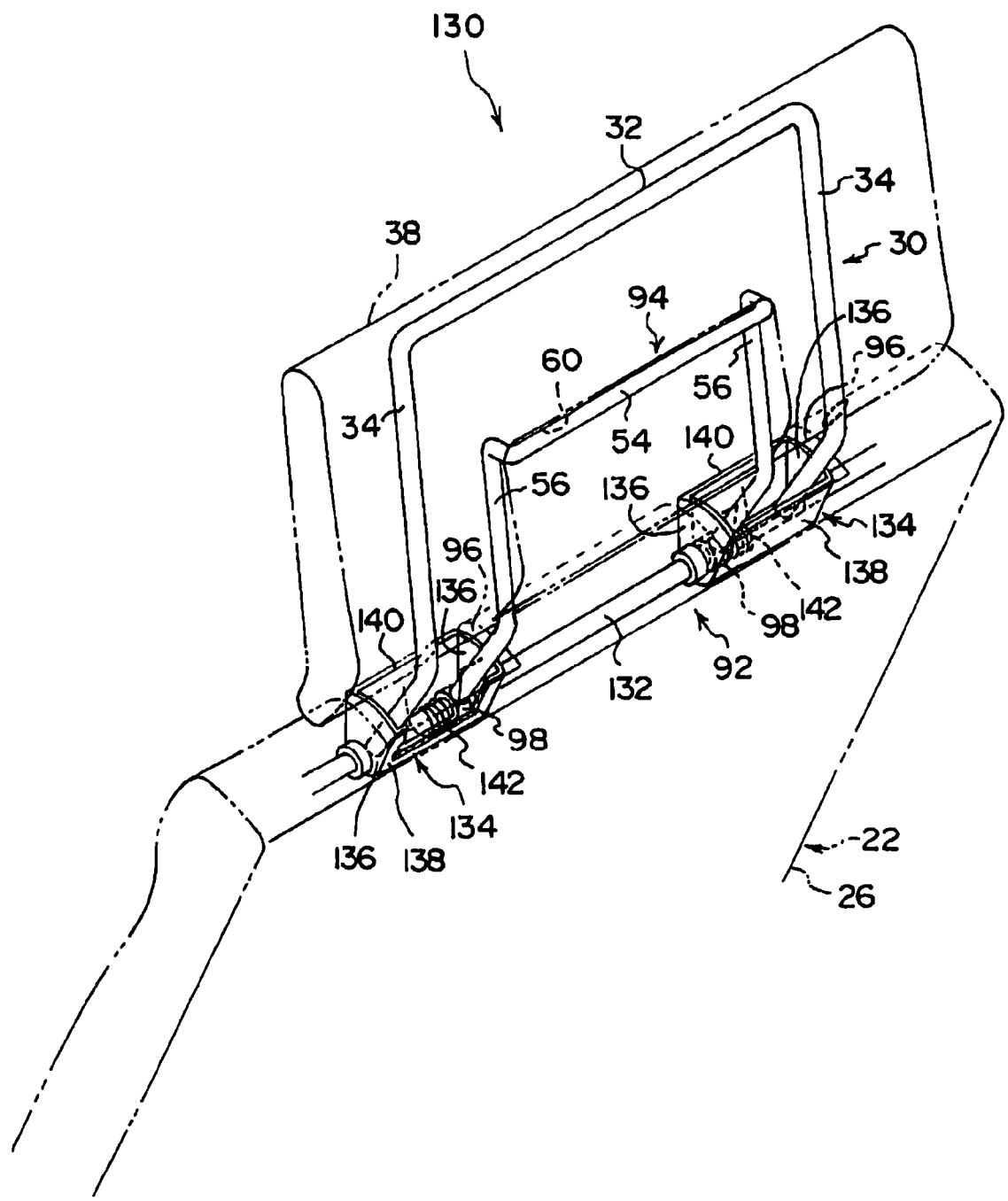
FIG. 12 is a perspective view of a main part of a vehicle seat in accordance with a third embodiment of the present invention in a comfortable seat state.
Figure 14:
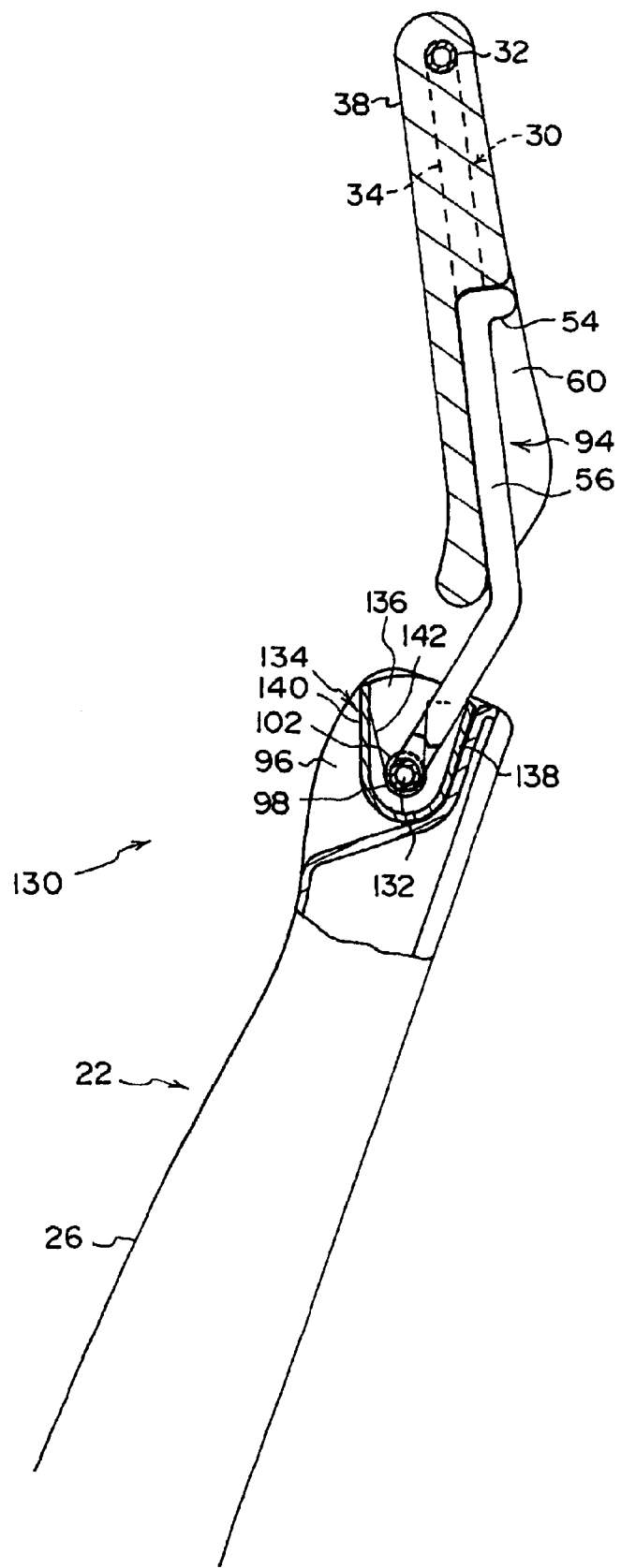
FIG. 14 is a side sectional view of the main part of the vehicle seat in accordance with the third embodiment of the present invention in the comfortable seat state.

FIG. 12 is a perspective view illustrating the configuration of a main part of the vehicle seat 130 in accordance with the third embodiment of the present invention. FIG. 14 is a sectional view illustrating the configuration of the main part of the vehicle seat 130.

As shown in FIG. 12 and FIG. 14, the vehicle seat 130 includes a support shaft 132, in place of the support shaft 100. Like the support shaft 100 according to the second embodiment, the support shaft 132 according to the third embodiment is configured as an elongated rod-shape member that extends in the width direction of the vehicle seat 130. However, the support shaft 132 is rotatably coupled to the seat back frame of the seat back 22 about an axis that is defined along the width direction of the vehicle seat 130. Further, the support shaft 132 is integrally coupled to the end of the longitudinal part 34 of the headrest bracket 30, which is opposite to the end of the lateral part 32.

Thus, when the headrest 38 of the vehicle seat 130 is rotated toward the front of the seat back 22, the support shaft 132 is integrally rotated to the headrest 38. Also, the support shaft 132 passes through the attaching part 98 provided on the end of the longitudinal part 56 of the interference bar 94, which is opposite to the end of the lateral part 54. Therefore, the interference bar 94 can be relatively rotated, pivoting on the support shaft 132.

The vehicle seat 130 includes interlocking member 134 as the interlocking unit, in place of the link mechanism 104 of the second embodiment. The interlocking member 134 includes a pair of opposite walls 136 of a sectorial shape. The pair of opposite walls 136 are formed to be opposite each other in the width direction of the vehicle seat 130 through one side of longitudinal parts 56 of the interference bar 94 and one side longitudinal part 334 of the headrest bracket 30. That is, one side of the longitudinal parts 56 of the interference bar 94 and one side of the longitudinal parts 34 of the headrest bracket 30 are interposed between the pair of opposite walls 136.

A support shaft 132 passes through the opposite wall 136. That is, the support shaft 132 passes through a portion corresponding to the pivot portion of the opposite wall 136 or a vicinity of a portion corresponding to the pivot portion when regarding a shape of the opposite wall as the sectorial shape. The interlocking member 134 can pivot about the support shaft 132. The interlocking member 134 includes a contact wall 138 as a first contact wall and a contact wall 140 as a second contact wall. Further, the contact wall 138 faces the longitudinal part 56 of the interference bar 94 and the longitudinal part 34 of the headrest bracket 30 about an axis, which is defined the support shaft 132. The contact wall 140 faces the longitudinal part 56 of the interference bar 94 and the longitudinal part 34 of the headrest bracket 30 about an axis, which coincides with the support shaft 132.

The contact walls 138 and 140 are formed along the outer periphery side of the opposite walls 136 and is connected each other between the pivot portion of the opposite walls 136 when regarding a shape of the opposite wall as the sectorial shape. Accordingly, the contact walls 138 and 140 is bended a U-shape cross-section when viewing overall from side. Further, the interlocking member 134 includes an interlocking spring 142 as the urging member. The interlocking spring 142 is configured as a torsion coil spring, etc. One end of the spring 142 is fixed to the interlocking member 134, while the other end thereof is fixed to the longitudinal part 56 of the interference bar 94. Thus, the spring 142 is urged the interference bar 94 to the contact wall 138.

In the comfortable seat state shown in FIG. 12 and FIG. 14, When the headrest 38 of the vehicle seat 130 pivots about the support shaft 132, toward the front of the seat back 22, the longitudinal part 34 of the headrest bracket 30 is rotated inside of interlocking member 134 and approaches the contact walls 140 of the interlocking member 134. In the above state, the longitudinal part 56 of the interference bar 94 is urged toward the contact wall 138 of the interlocking member 134 by the urging force of the interlocking spring 142, so that the longitudinal part 56 of the interference bar 94 do not approach the contact wall 140 according to the rotation of the longitudinal part 34 of the headrest bracket 30. Thus, the headrest bracket 30 and the interference bar 94 rotate relative to each other, so that the interference bar 94 is extended from the receiving hole 60.

Thereafter, the headrest 38 is rotated further forward until the longitudinal part 34 of the headrest bracket 30 come into contact with the contact wall 140. When the headrest 38 in the above state is rotated further toward the front of the seat back 22, the longitudinal part 34 of the headrest bracket 30 urges the contact wall 140, thus pivoting the interlocking member 134 about the support shaft 132. As described above, the longitudinal part 56 of the interference bar 94 is urged toward the contact wall 138 by rotation of interlocking member 134 urged by the longitudinal part 56, so that the interference bar 94 pivots about the support shaft 132.

Figure 13:
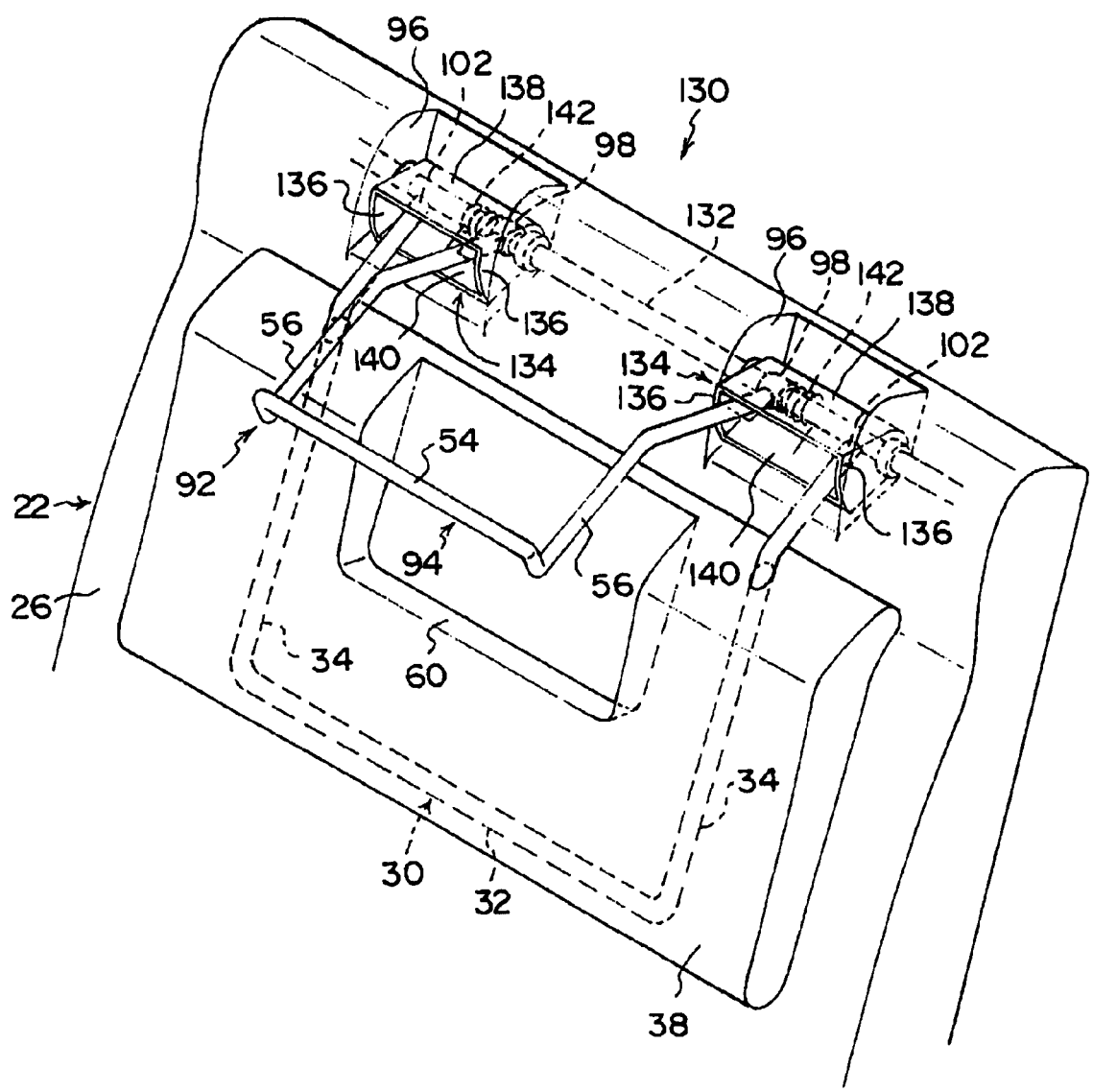
FIG. 13 is a perspective view of the main part of the vehicle seat in accordance with the third embodiment of the present invention in an uncomfortable seat state, in which a headrest is folded.
Figure 15:
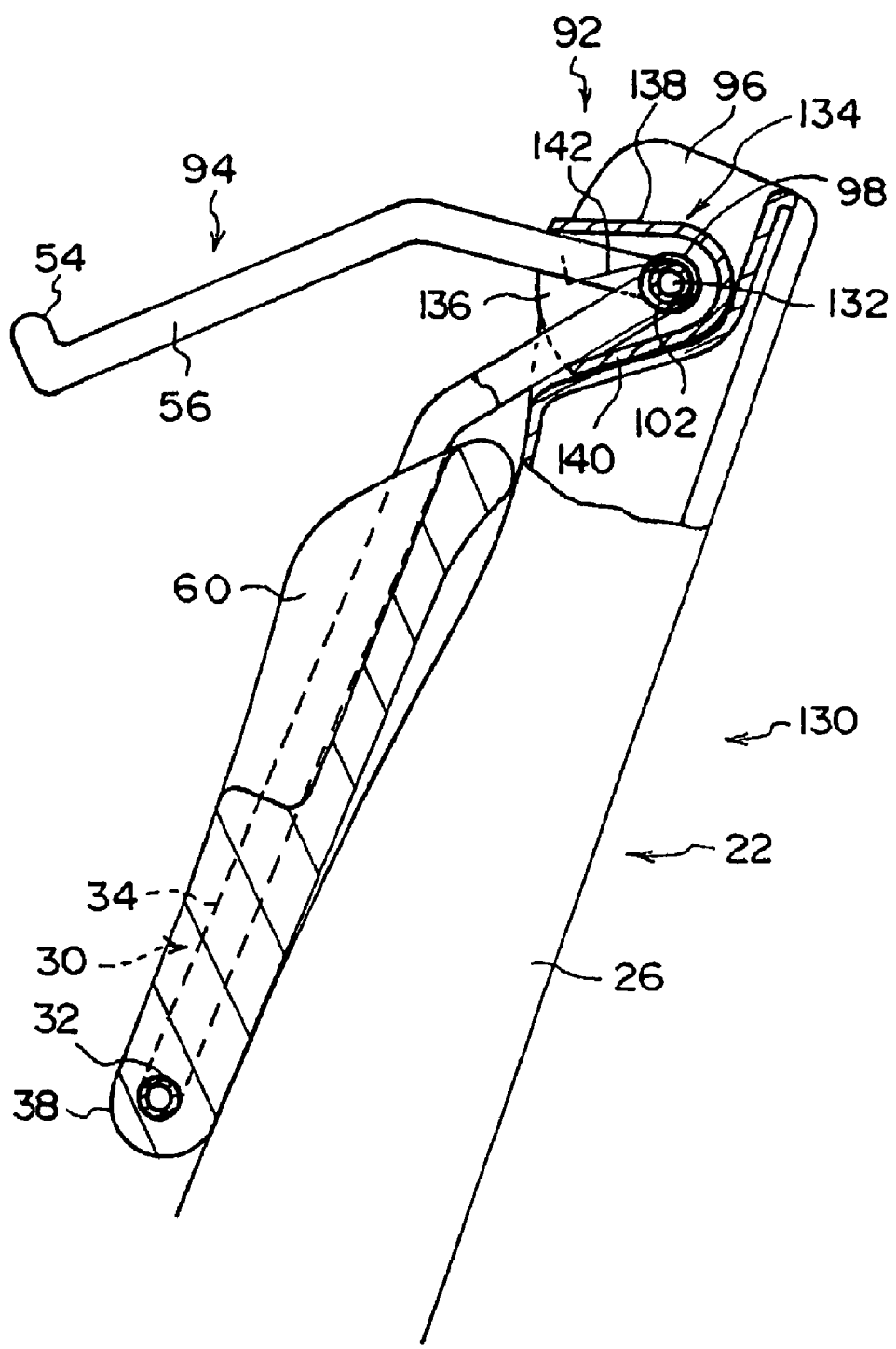
FIG. 15 is a side sectional view of the main part of the vehicle seat in accordance with the third embodiment of the present invention in the uncomfortable seat state, in which the headrest is folded.

As shown in FIG. 13 and FIG. 15, when the headrest 38 is rotated toward the front of the seat back 22, the interference bar 94 extending from the receiving hole 60 is placed in front of the rear surface of the headrest bracket 30, which faces toward the front of the vehicle seat 130. Therefore, when a passenger tries to sit on the vehicle seat 130 in the above state, the interference bar 94 extending from the receiving hole 60 interferes with the back of the passenger. Thus, the vehicle seat 130 in the uncomfortable seat state prevents a passenger from sitting thereon.

Figure 16:
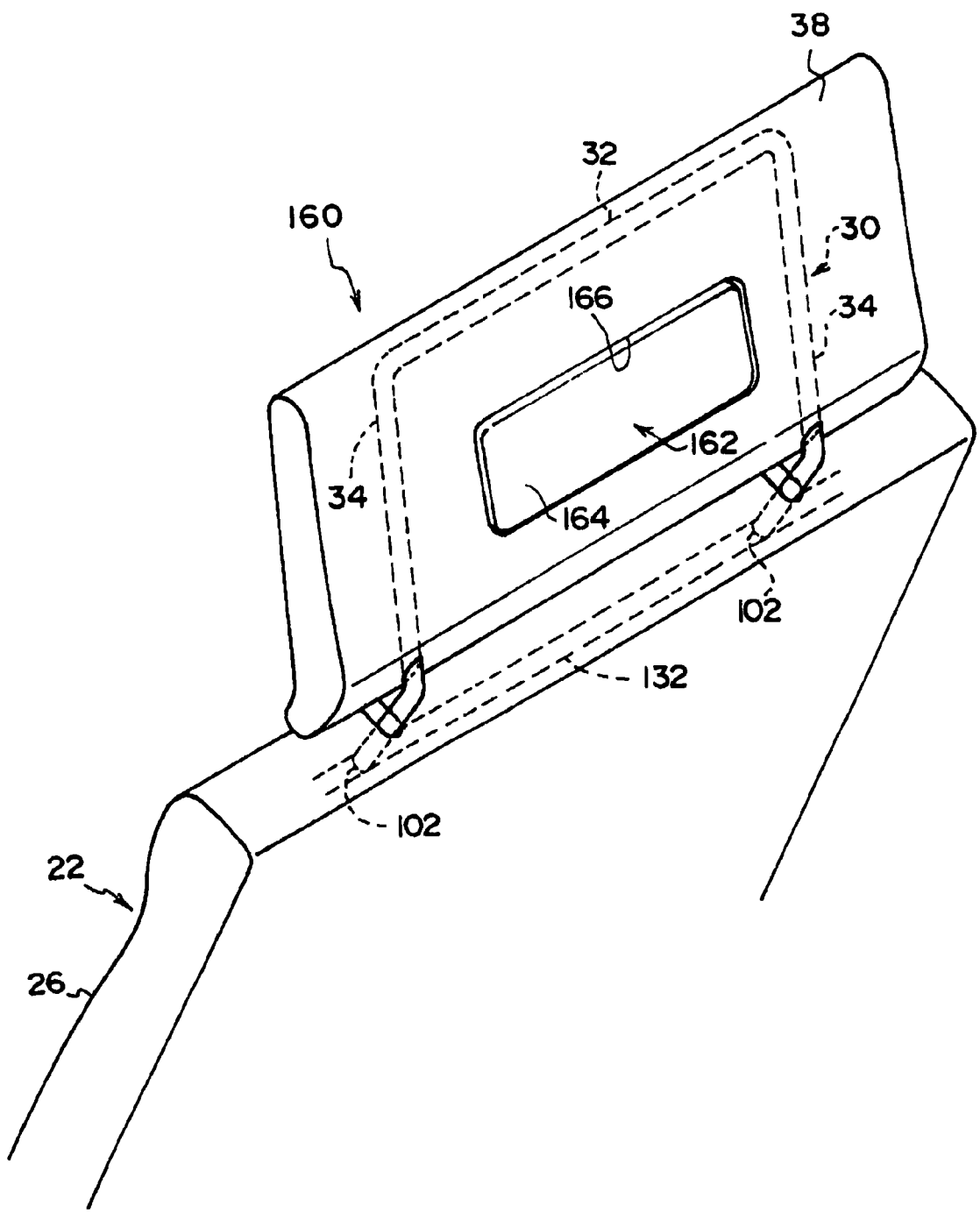
FIG. 16 is a perspective view of a main part of a vehicle seat in accordance with a fourth embodiment of the present invention in a comfortable seat state.
Figure 18:
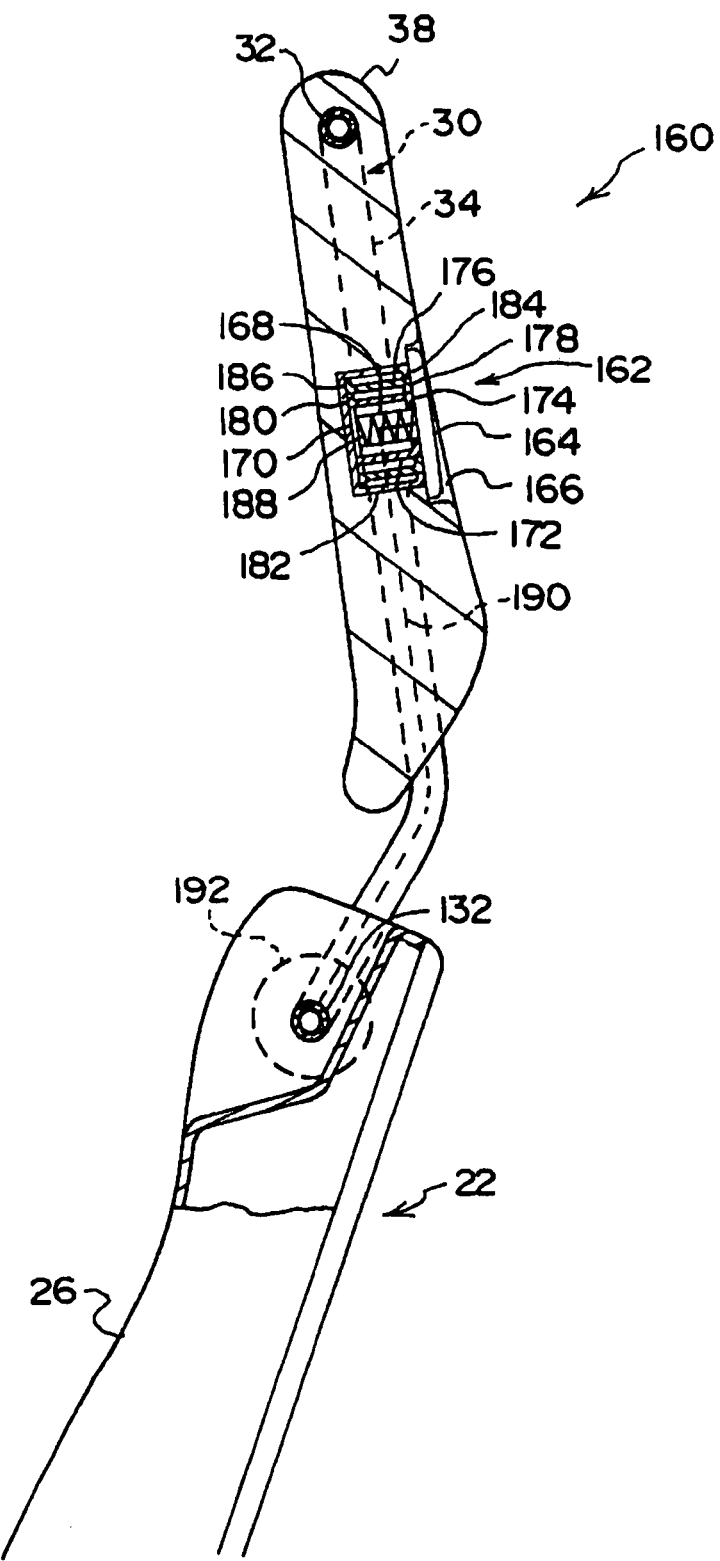
FIG. 18 is a side sectional view of the main part of the vehicle seat in accordance with the fourth embodiment of the present invention in the comfortable seat state.

FIG. 16 is a perspective view illustrating the configuration of a main part of a vehicle seat 160 in accordance with the fourth embodiment of the present invention. FIG. 18 is a sectional view illustrating the configuration of the main part of the vehicle seat 160.

As shown in FIG. 16 and FIG. 18, the vehicle seat 160 includes a sitting restriction unit 162 as the interference unit. The sitting restriction unit 162 includes an interference plate 164 having a flat plate shape that serves as the interference member. A receiving portion 166, having a shape corresponding to the shape of the interference plate 164, is formed in the headrest 38. The receiving portion 166 is formed to be open in the rear surface of the headrest 38. The interference plate 164 is inserted into the receiving part 166 and is received therein. In the embodiment, the interference plate 164 is movable forward and backward in a direction substantially perpendicular to the surface of the headrest 38. The sitting restriction unit 162 includes a support block 168, a receiving part for receiving the support block 168 therein, and a movement restriction part for restricting the movement of the interference plate 164, etc. The receiving part includes a first tube 172, a second tube 176, and a housing 182. The movement restriction part includes a first contact flange 170, a first retaining flange 174, a second retaining flange 178, a second contact flange 180, a third retaining flange 184, and a third contact flange 186.

The support block 168 is integrally fixed to the rear surface of the interference plate 164, which faces the headrest 38. The first contact flange 170 as the first contact flange is extended substantially parallel to the interference plate 164 from an end of the support block 168, which is opposite to an end of the interference plate 164.

Further, the sitting restriction unit 162 includes the first tube 172. The first tube 172 has a tube structure that can receive both the support block 168 and the first contact flange 170 therein. The first retaining flange 174 is formed on the end of the interference plate 164 of the first tube 172. The first retaining flange 174 faces the first contact flange 170 in the axial direction of the first tube 172. When the support block 168 extends toward the first retaining flange 174 of the first tube 172, the first contact flange 170 of the support block 168 comes into contact with the first retaining flange 174. Thus, further movement of the support block 168 is restricted and the support block 168 is prevented from extending from the first tube 172.

The sitting restriction unit 162 includes the second tube 176. The second tube 176 has a tube structure capable of receiving the first tube 172 therein. The second retaining flange 178 is formed on the opposite side end of the interference plate 164 of the second tube 176. Corresponding with the second retaining flange 178, the second contact flange 180 is formed an end of the first tube 172, which is opposite to an end of the first retaining flange 174. The second contact flange 180 faces the second retaining flange 178 in the axial direction of the second tube 176. When the support block 168 received in the second tube 176 is moved toward the second retaining flange 178, the second contact flange 180 comes into contact with the second retaining flange 178. Thus, further movement of the first tube 172 is restricted, so that the first tube 172 is prevented from being fully extruded from the second tube 176.

The sitting restriction unit 162 includes a housing 182. The housing 182 is configured as a tube shape (or box shape) having bottom capable of receiving the second tube 176 therein, and is installed in the headrest 38. The end of the interference plate 164 of the housing 182 is formed with the third retaining flange 184. Corresponding with the third retaining flange 184, the third contact flange 186 is formed on an end of the second tube 176, which is opposite to an end of the second retaining flange 178. The third contact flange 186 faces the third retaining flange 184 in the axial direction of the second tube 176. When the second tube 176 placed inside the housing 182 is moved toward the third retaining flange 184, the third contact flange 186 comes into contact with the third retaining flange 184. Thus, further movement of the second tube 176 is restricted, so that the second tube 176 is prevented from extending from the housing 182.

A compression coil spring 188 constituting the urging member is received in the housing 182. One end of the compression coil spring 188 is contacted on the bottom of the housing 182. The other end of the compression coil spring 188 passes through the tubes 176 and 172 and comes into contact with the support block 168. Thus, the compression coil spring 188 urges the support block 168 and the interference plate 164 away from the receiving portion 166.

One end of a wire 190 constituting the interlocking unit is inserted into the housing 182. The wire 190 inserted into the housing 182 passes through the tubes 176 and 172. Thereafter, the one end of the wire 190 is fixed to the support block 168. The other end of the wire 190 pulls at a certain position of the headrest 38 and is inserted into the headrest bracket 30.

After the wire 190 is inserted into the headrest bracket 30, the wire 190 passes through the support shaft 132. Thereafter, the wire 190 comes out of the support shaft 132 through a wire passage (not shown) formed in the support shaft 132 at a location around a winding part 192 installed on the seat back frame of the seat back 22, and is latched on the winding part 192 at the other end thereof.

Here, the other end of the wire 190 latched on the winding part 192, and the wire passage, which is formed in the support shaft 132 and allows the wire 192 to pass through, can contact and separate depend on the rotation of the headrest 38. Described in detail, in the comfortable seat state the other end of the wire 190 is spaced apart from the wire passage of the support shaft 132 as far as possible, so that the wire 190 can be wound around the wire winding part 192. However, when the headrest 38 is rotated toward the front of the seat back 22, the support shaft 132 is rotated such that the wire passage thereof approaches the latched other end of the wire 190.

In the comfortable seat state shown in FIG. 16 and FIG. 18, when the headrest 38 of the vehicle seat 160 is rotated about the support shaft 132 toward the front of the seat back 22, the passage of the support shaft 132 approaches the joint of the winding part 192 connected to the other end of the wire 190. Thus, the wire 190 is loosened at the location around the other end thereof to an extent corresponding to the extent to which the hole of the support shaft 132 approaches the other end of the wire 190. When the wire 190 is loosened as described above, the compression coil spring 188 elastically moves the support block 168 away from the bottom of the housing 182 by the amount that the wire 190 is loosened. Thus, the interference plate 164 extends from the receiving portion 166.

Figure 17:
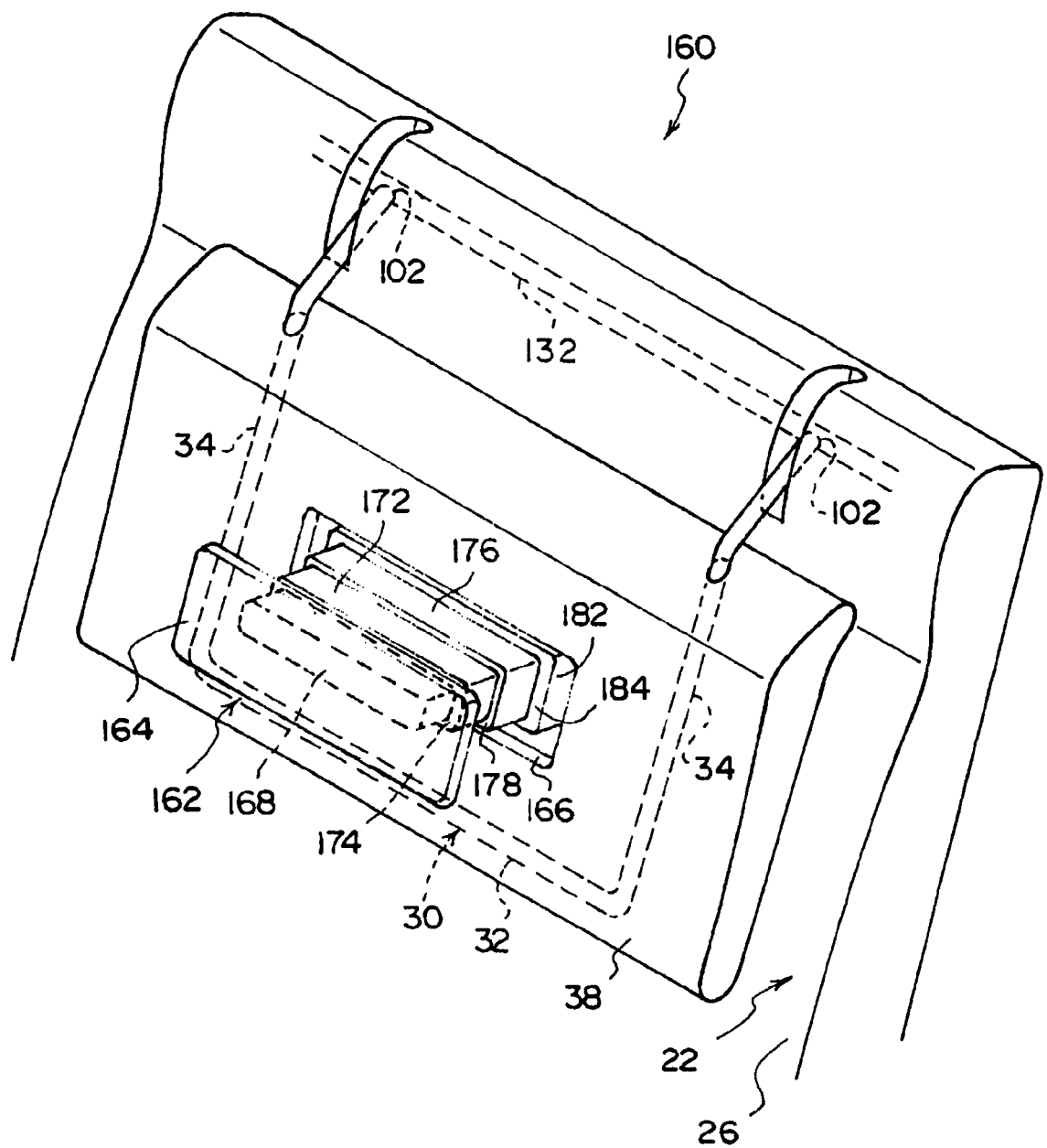
FIG. 17 is a perspective view of the main part of the vehicle seat in accordance with the fourth embodiment of the present invention in an uncomfortable seat state, in which a headrest is folded.
Figure 19:
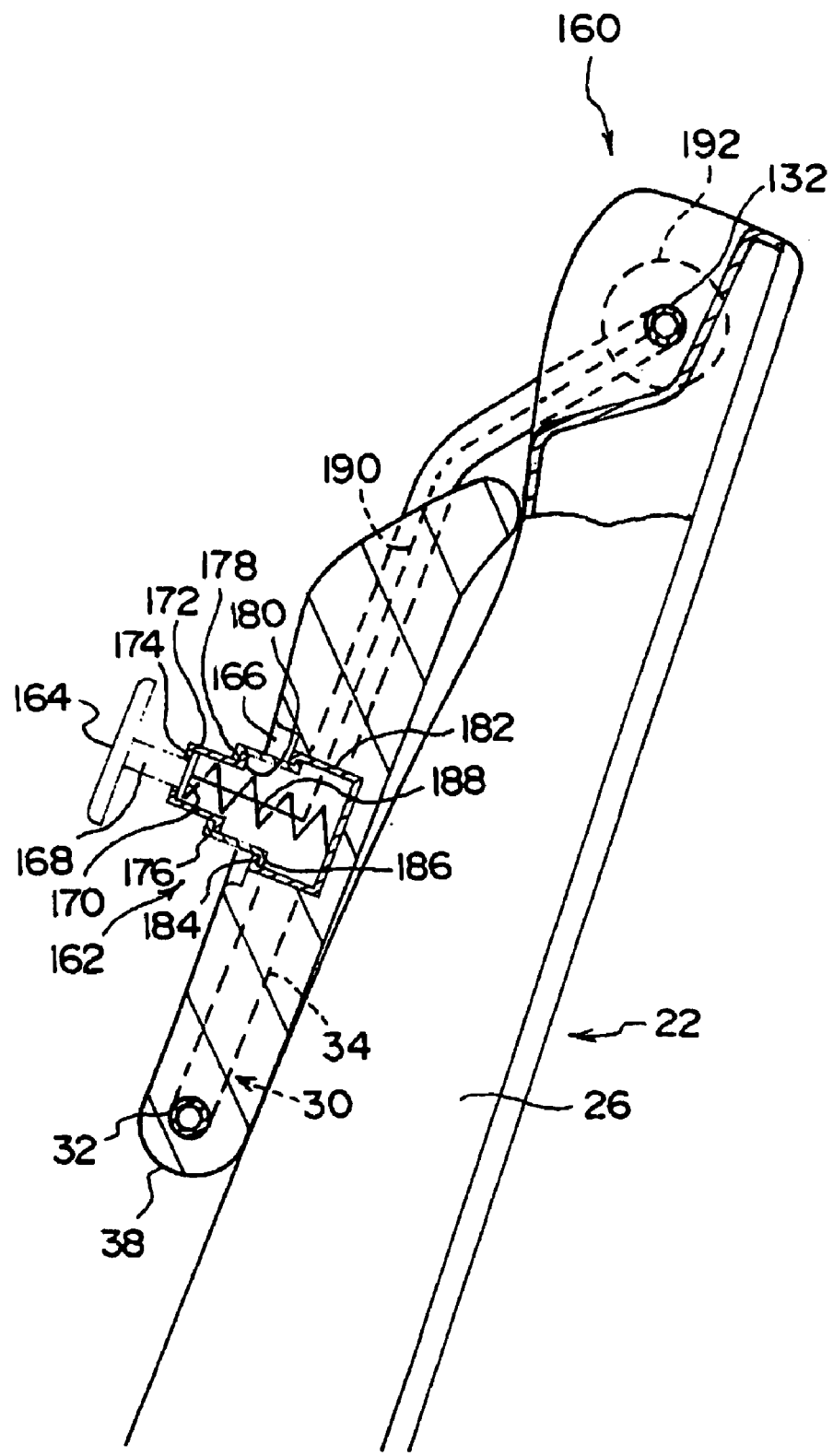
FIG. 19 is a side sectional view of the main part of the vehicle seat in accordance with the fourth embodiment of the present invention in the uncomfortable seat state, in which the headrest is folded.

When the headrest 38 is rotated toward the front of the seat back 22, as shown in FIG. 17 and FIG. 19, the receiving portion 166 faces towards the front of the vehicle seat 160. Thus, the vehicle seat 160 is converted into the uncomfortable seat state. If a passenger tries to sit on the vehicle seat 160 in the uncomfortable seat state, the interference plate 164 interferes with the back of the passenger. Thus, the vehicle seat 160 in the uncomfortable seat state prevents a passenger from sitting thereon.

In the uncomfortable seat state of the vehicle seat 160, in which the headrest 38 is rotated such that the rear surface of the headrest 38 faces forwards relative to the vehicle seat 160, it is better for the interference plate 164 to be moved forward in front of the headrest 38 as far as possible. However, in the embodiment, the interference plate 164 in the comfortable seat state must be substantially received into the receiving portion 166. In addition, the space for receiving the support block 168 and the housing 182 must be limited to a level substantially less than the thickness of the headrest 38.

In the embodiment, the sitting restriction unit 162 of the vehicle seat 160 includes the tubes 172 and 176. Thus, the support block 168 of the interference plate 164 may be spaced apart from the housing 182 by the sum of the axial length of the tube 172 and the axial length of the tube 176. Further, the tube 176 is received in the housing 182, the tube 172 is received in the tube 176, and the support block 168 is received in the tube 172. Therefore, the size of the sitting restriction unit 162 from the housing 182 may be reduced when the interference plate 164 is in its received position in the receiving portion 166. Further, in the above state, all of the elements constituting the sitting restriction unit 162 may be received in the headrest 38.

In the embodiments of the present invention, the interference unit (or the interference member) is installed in the headrest 38. However, in accordance with the first and second aspects of the present invention, the location of the interference unit (or the interference member) is not limited to the headrest 38, but may be provided in another location as long as the interference unit can interfere with the body of a passenger to make the passenger feel uncomfortable and thereby inform the passenger of an uncomfortable seat state if the passenger tries to sit on the vehicle seat 10, 90, 130, 160 in the uncomfortable seat state.

For example, the interference member constituting the interference unit may be installed in the seat back 22 such that the interference member may be interlocked with the rotation of the headrest 38 toward the front of the seat back 22 and interferes with the body of a passenger when the passenger tries to sit on the vehicle seat. As a further alternative, the interference member constituting the interference unit may be installed in the seat cushion 12 such that the interference member may be interlocked with the rotation of the headrest 38 toward the front of the seat back 22, and interferes with the body of a passenger on the upper side of the seat cushion 12 when the passenger tries to sit on the vehicle seat.

In the embodiments of the present invention, the state of the vehicle seat 10, 90, 130, 160, in which the headrest 38 is rotated toward the front of the seat back 22, is designated as the uncomfortable seat state. However, it should be understood that the uncomfortable seat state of the vehicle seat 10, 90, 130, 160 in the present invention is not limited to that in which the headrest 38 is rotated toward the front of the seat back 22, but may be a seat state in which a passenger cannot comfortably sit on the vehicle seat, regardless of the style of the vehicle seat.

While the invention is shown and described with respect to the example embodiments, it will be understood by those skilled in the art that various changes and modifications may be made without departing from the spirit and scope of the invention as defined in the following claims.

What is claimed is:

1. A vehicle seat comprising:
   a seat body comprising a seat cushion having a seat surface, a seat back, having a front surface, connected to the seat cushion, and a headrest, having a front surface, pivotally connected to the seat back, the seat body convertible between a first seat state with the headrest positioned on a top side of the seat back, in which a passenger can sit in a first body position on the seat body, and a second seat state with the headrest rotated such that the headrest front surface faces the seat back front surface; and
   an interference unit positioned to interfere with the passenger when the passenger tries to sit on the seat body in the second seat state;
   wherein the interference unit comprises an interlocking unit that moves the interference unit when the seat body is in the second seat state; and an interference member, received in a receiving portion of the rear surface of the headrest of the seat body when the seat body is in the first seat state; and
   wherein the interlocking unit moves the interference member from the receiving portion to an interfering position in response to an interlocking with a conversion of the state of the seat body from the first seat state to the second seat state.

2. The vehicle seat according to claim 1,
   wherein the interference member comprises a frame, and the interfering position is a position wherein the frame projects out from the headrest in a direction of the passenger trying to sit on the seat body in the second seat state.

3. The vehicle seat according to claim 1, wherein the seat back includes a seat back frame, and
   wherein the headrest includes a headrest bracket having a lateral part that extends in a width direction of the seat body and a longitudinal part that extends from each end of the lateral part.

4. The vehicle seat according to claim 3, wherein the seat body includes an urging member that urges the interference member in one direction.

5. The vehicle seat according to claim 4, wherein the interference unit comprises:
   an interference plate as the interference member, having a flat plate shape and being movable forward and backward of the seat back from a surface of the headrest by the interlocking unit;
   a support block fixed to a rear surface of the interference plate;
   a receiving part for receiving the support block therein; and
   a movement restriction part for restricting movement of the interference plate.

6. The vehicle seat according to claim 5, wherein the receiving part comprises:
   a first tube having a tubular shape for receiving the support block therein;
   a second tube having a tubular shape for receiving the first tube therein; and
   a housing having a tubular shape or a box shape and having a bottom for receiving the second tube therein, the housing being installed in the headrest.

7. The vehicle seat according to claim 6, wherein the movement restriction part comprises:
   a first contact flange provided on an opposite side end of the interference plate of the support block and extended parallel to the interference plate;
   a first retaining flange provided on an end of the interference plate of the first tube;
   a second retaining flange provided on an end of the interference plate of the second tube;
   a second contact flange provided on an opposite side end of the first retaining flange of the first tube;
   a third retaining flange provided on an end of the interference plate of the housing; and
   a third contact flange provided on an opposite side end of the second retaining flange of the second tube.

8. The vehicle seat according to claim 7, wherein
   the first retaining flange and the first contact flange are opposite to each other in an axial direction of the first tube;
   the second retaining flange and the second contact flange are opposite to each other in an axial direction of the second tube; and
   the third retaining flange and the third contact flange are opposite to each other in an axial direction of the second tube.

9. The vehicle seat according to claim 8, wherein the interlocking unit comprises a wire, one end of the wire is inserted into the housing and is fixed to the support block, and the other end of the wire is latched on a winding part formed in the seat back frame after the other end passes through a passing hole formed in the support shaft, and
   wherein the other end of the wire latched on the winding part, and the passage formed in the support shaft through which the wire passes, are formed to be contact with or separate from each other according to rotation of the headrest.

10. The vehicle seat according to claim 9, wherein the urging member comprises a spring that urges the interference plate away from the receiving portion, and wherein one end of the spring contacts the bottom of the housing and the other end of the spring contacts the support block.

11. A vehicle seat comprising:
    a seat body convertible between a first seat state, in which a passenger can sit in a first body position on the seat body, and a second seat state, in which the passenger can sit in a second body position on the seat body;
    an interference unit positioned to interfere with the passenger when the passenger tries to sit on the seat body in the second seat state;
    wherein the interference unit comprises an interlocking unit that moves the interference unit when the seat body is in the second seat state; and an interference member, received in a receiving portion of a headrest of the seat body when the seat body is in the first seat state, and wherein the interlocking unit moves the interference member from the receiving portion in response to an interlocking with a conversion of the state of the seat body from the first seat state to the second seat state;

wherein the seat body comprises a seat cushion having a seat surface, a seat back connected to the seat cushion and the headrest supported in the first seat state on a top side of the seat back, that is moveable relative to the seat back by releasing the headrest from the first seat state when the headrest is moved from the first seat state to the second seat state;

wherein the seat back includes a seat back frame;

wherein the headrest includes a headrest bracket having a lateral part that extends in a width direction of the seat body and a longitudinal part that extends from each end of the lateral part;

wherein the seat body includes an urging member that urges the interference member in one direction;

wherein the interference member comprises an interference bar having a concave shape that is open on one side, the interference bar including a lateral part that extends in the width direction of the seat body;

the lateral part of the interference bar having a first and a second end; wherein a first longitudinal part extends from the first end of the lateral part of the interference bar and a second longitudinal part extends from the second end of the lateral part of the interference bar.

12. The vehicle seat according to claim 11, wherein:

an attaching part extends from a lower end of the longitudinal part of the interference bar in an outside length direction of the lateral part; and the attaching part formed on the first longitudinal part of the interference bar and the attaching part formed on the second longitudinal part of the interference bar are coaxially placed along the width direction of the seat body; and the attaching part is rotatably supported by a supporting part formed on the longitudinal part of the headrest bracket.

13. The vehicle seat according to claim 12, wherein the interlocking unit comprises a wire, with one end of the wire being fixed to the longitudinal part of the interference bar, and another end of the wire being fixed to the seat back frame after the other end of the wire is wound around the attaching part formed on the longitudinal part of the interference bar and a supporting part formed on the seat back frame.

14. The vehicle seat according to claim 13, wherein the urging member unit comprises a spring that urges the interference bar toward the receiving portion, and wherein one end of the spring is fixed to the longitudinal part of the headrest bracket, and the other end of the spring is fixed to the interference bar.

15. The vehicle seat according to claim 11, wherein the lower end of the longitudinal part of the interference bar is provided to a recess formed in the seat back, a cylindrical attaching part is formed to the lower end of the longitudinal part of the interference bar and the lower end of the longitudinal part of the headrest bracket, a support shaft constituting the seat back frame passes through inside the attaching part formed in the interference bar and the attaching part formed in the headrest, and the support shaft rotatably supports about an axis, which is defined along the width direction of the seat body, both the interference bar and the headrest.

16. The vehicle seat according to claim 15, wherein the interlocking unit comprises a link mechanism, the link mechanism comprising: a first swing arm rotatably connected at one end in length direction thereof to the longitudinal part of the headrest bracket; a second swing arm rotatably connected at one end in length direction thereof to the other end in length direction of the first swing arm and rotatably connected at the other end thereof to the longitudinal part of the interference bar; and a support arm relatively rotatably connected at one end in length direction thereof to a joint between the first swing arm and the second swing arm and connected at the other end thereof to the longitudinal part of the interference bar through a guide hole formed in the longitudinal part of the interference bar.

17. The vehicle seat according to claim 16, wherein the urging member comprises a spring that urges the interference bar away from the receiving portion, and wherein one end of the spring is fixed to the support shaft, and the other end of the spring is fixed to the longitudinal part of the interference bar.

18. The vehicle seat according to claim 11, wherein the lower end of the longitudinal part of the interference bar is provided to a recess formed in the seat back, a support shaft is rotatably connected to the seat back frame of the seat back and the lower end of the longitudinal part of the headrest bracket is integrally connected to the support shaft, the support shaft passes through an attaching part formed in the lower end of the longitudinal part of the interference bar, and the interference bar pivots on the support shaft.

19. The vehicle seat according to claim 18, wherein the interlocking unit comprises an interlocking member, the interlocking member comprising: a pair of opposite walls of a sectorial shape formed to be opposite each other along the width direction of the seat body through the longitudinal part of the interference bar and the longitudinal part of the headrest bracket; a first contact wall formed along outer periphery side of the opposite walls and connected between a pivot portion of the sectorial shape of the opposite walls, and a second contact wall formed on the opposite side of the first contact wall, and wherein the support shaft passes through the pair of opposite walls.

20. The vehicle seat according to claim 19, wherein the urging member comprises a spring that urges the interference bar toward the contact wall, and wherein one end of the spring is fixed to the interlocking member and the other end of the spring is fixed to the longitudinal part of the interference bar.

* * * * *